United States Patent
Balakrishnan et al.

(10) Patent No.: US 10,230,305 B2
(45) Date of Patent: Mar. 12, 2019

(54) TECHNIQUES FOR CONTROLLING A POWER CONVERTER USING MULTIPLE CONTROLLERS

(71) Applicant: Power Integrations, Inc., San Jose, CA (US)

(72) Inventors: Balu Balakrishnan, Saratoga, CA (US); Alex B. Djenguerian, Saratoga, CA (US); Sheng Liu, San Jose, CA (US)

(73) Assignee: Power Integrations, Inc., San Jose, CA (US)

( * ) Notice: Subject to any disclaimer, the term of this patent is extended or adjusted under 35 U.S.C. 154(b) by 0 days.

(21) Appl. No.: 15/670,937

(22) Filed: Aug. 7, 2017

(65) Prior Publication Data

US 2017/0338745 A1    Nov. 23, 2017

Related U.S. Application Data

(63) Continuation of application No. 14/837,877, filed on Aug. 27, 2015, now Pat. No. 9,762,129, which is a
(Continued)

(51) Int. Cl.
| | |
|---|---|
| H02M 1/36 | (2007.01) |
| H02M 3/335 | (2006.01) |
| H02M 3/156 | (2006.01) |

(52) U.S. Cl.
CPC ....... *H02M 3/33523* (2013.01); *H02M 3/156* (2013.01); *H02M 3/335* (2013.01); *H02M 1/36* (2013.01); *H02M 3/33553* (2013.01)

(58) Field of Classification Search
CPC .......................... H02M 1/36; H02M 3/33553
See application file for complete search history.

(56) References Cited

U.S. PATENT DOCUMENTS

| | | |
|---|---|---|
| 5,162,970 A | 11/1992 | Davis, Jr. et al. |
| 5,650,357 A | 7/1997 | Dobkin et al. |
| (Continued) | | |

FOREIGN PATENT DOCUMENTS

| | | |
|---|---|---|
| JP | H 09-260569 | 10/1997 |
| JP | 2007-288827 | 11/2007 |
| (Continued) | | |

OTHER PUBLICATIONS

EP Patent Application No. 14157603.3—European Search Report, dated Mar. 10, 2015 (3 pages).
(Continued)

*Primary Examiner* — Harry R Behm
(74) *Attorney, Agent, or Firm* — Christensen O'Connor Johnson Kindness PLLC

(57) ABSTRACT

A power converter controller includes a primary controller configured to operate in a first mode to control a power switch with a primary switching pattern. A communication link is coupled to the primary controller. A secondary controller coupled to the communication link. The secondary controller is galvanically isolated from the primary controller. The secondary controller is configured to initiate a transition operation with the primary controller to take control of the power switch with one or more control signals through the communication link. The primary controller is configured to acknowledge receipt of the one or more control signals through the communication link to the secondary controller and transition from the first mode to a second mode.

20 Claims, 9 Drawing Sheets

Related U.S. Application Data continuation of application No. 13/791,732, filed on Mar. 8, 2013, now Pat. No. 9,136,765.

(56) References Cited

U.S. PATENT DOCUMENTS

| | | | |
|---|---|---|---|
| 6,301,135 B1 | 10/2001 | Mammano et al. | |
| 6,384,478 B1 | 5/2002 | Pour | |
| 6,456,511 B1 | 9/2002 | Wong | |
| 6,504,267 B1 | 1/2003 | Giannopoulos | |
| 6,998,952 B2 | 2/2006 | Zhou et al. | |
| 7,468,547 B2 | 12/2008 | Harvey | |
| 7,524,731 B2 | 4/2009 | Wang | |
| 7,619,297 B2 | 11/2009 | Wang | |
| 7,868,431 B2 | 1/2011 | Feng et al. | |
| 7,884,696 B2 | 2/2011 | Hébert et al. | |
| 8,093,983 B2 | 1/2012 | Fouquet et al. | |
| 8,772,909 B1 | 7/2014 | Vinciarelli | |
| 9,136,765 B2 | 9/2015 | Balakrishnan et al. | |
| 9,166,486 B2 | 10/2015 | Matthews et al. | |
| 2004/0120163 A1 | 6/2004 | Nakagawa | |
| 2004/0214376 A1 | 10/2004 | Gibson et al. | |
| 2005/0271148 A1 | 12/2005 | Dupuis | |
| 2006/0294047 A1 | 12/2006 | Johnston et al. | |
| 2010/0091523 A1 | 4/2010 | Uno et al. | |
| 2010/0133815 A1 | 6/2010 | Middendorf et al. | |
| 2010/0219802 A1 | 9/2010 | Lin et al. | |
| 2010/0254443 A1 | 10/2010 | Scharrer et al. | |
| 2011/0103103 A1 | 5/2011 | Zhan et al. | |
| 2011/0305043 A1 | 12/2011 | Matsumoto | |
| 2012/0099345 A1 | 4/2012 | Zhao et al. | |
| 2014/0036550 A1 | 2/2014 | Yang et al. | |
| 2014/0078790 A1 | 3/2014 | Lin et al. | |
| 2014/0254214 A1 | 9/2014 | Balakrishnan et al. | |
| 2015/0023080 A1* | 1/2015 | Chambon | H02M 1/0845 363/131 |
| 2015/0097598 A1* | 4/2015 | Cronin | H03K 17/18 327/109 |
| 2015/0229229 A1* | 8/2015 | Hafner | H02M 7/49 363/123 |

FOREIGN PATENT DOCUMENTS

| | | | | |
|---|---|---|---|---|
| WO | WO 2013156749 A1 * | 10/2013 | | H03K 17/18 |
| WO | WO 2013/030105 A3 | 12/2013 | | |
| WO | WO 2014053156 A1 * | 4/2014 | | H02M 7/49 |

OTHER PUBLICATIONS

EP Patent Application No. 14157603.3—European Office Action, dated Apr. 9, 2015 (5 pages).

EP Patent Application No. 14157603.3—European Office Action, dated Feb. 2, 2016 (23 pages).

CN Patent Application No. 201410085973.X—Chinese Office Action with English Translation, dated Jun. 29, 2017 (17 pages).

CN Patent Application No. 201410085973.X—Chinese Office Action with English Translation, dated Mar. 5, 2018 (6 pages).

JP Patent Application No. 2014-044925—Japanese Office Action with English Translation dated Dec. 12, 2017, 8 pages.

* cited by examiner

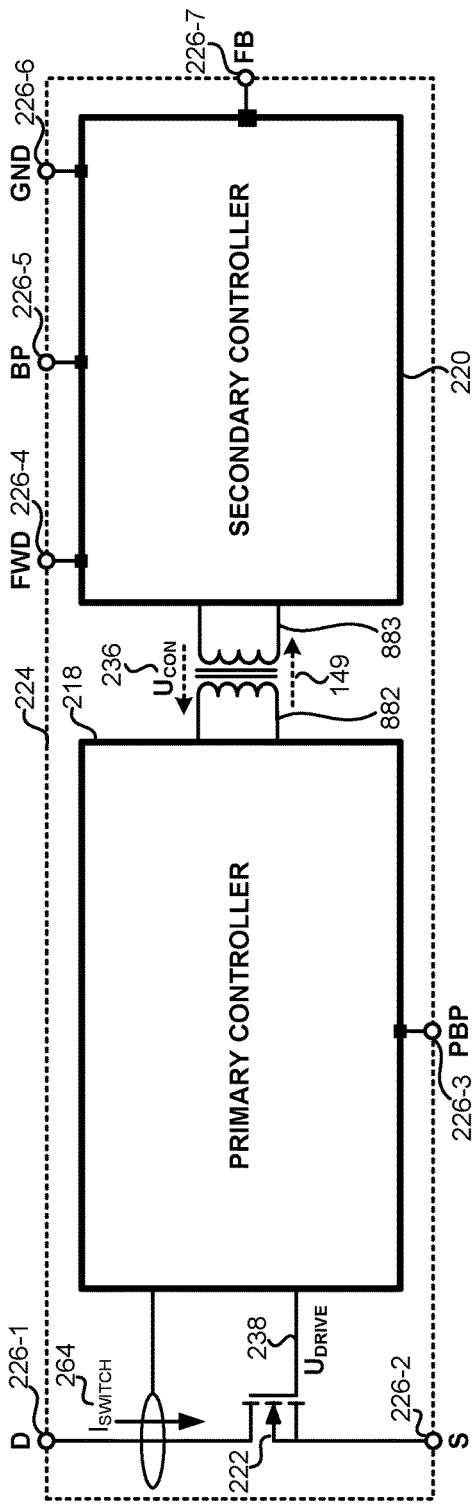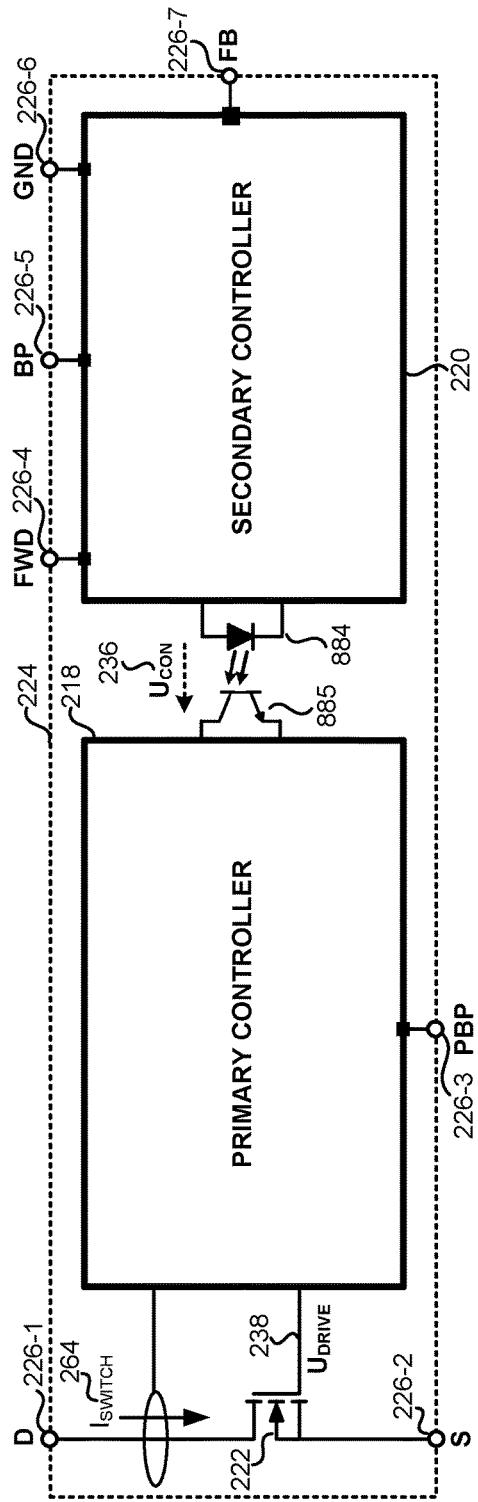
FIG. 8A
FIG. 8B

TECHNIQUES FOR CONTROLLING A POWER CONVERTER USING MULTIPLE CONTROLLERS

CROSS-REFERENCE TO RELATED APPLICATIONS

This application is a continuation of and claims priority to U.S. patent application Ser. No. 14/837,877, filed on Aug. 27, 2015, now pending, which is a continuation of and claims priority to U.S. patent application Ser. No. 13/791,732, filed on Mar. 8, 2013, now U.S. Pat. No. 9,136,765. U.S. patent application Ser. No. 14/837,877 and U.S. Pat. No. 9,136,765 are hereby incorporated by reference.

BACKGROUND INFORMATION

Field of the Disclosure

The disclosure relates to power converters, and more particularly, to control circuits for power converters.

Background

Switch mode power converters are widely used in household or industrial appliances for converting a low frequency (e.g., 50 Hz or 60 Hz) high voltage alternating current (ac) input voltage to a required level of direct current (dc) output voltage. For example, switch mode power converters may be included in commonly used electronic devices, such as battery chargers for mobile electronic devices. Various types of switch mode power converters are popular because of their well regulated output, high efficiency, and small size along with their safety and protection features. Popular topologies of switch mode power converters include flyback, forward, boost, buck, half bridge, and full bridge, among many others including resonant types.

Switch mode power converters may include an energy transfer element, a power switch, and control circuits that operate to regulate the value of the power converter output voltage. The energy transfer element (e.g., a coupled inductor) may include a primary winding and a secondary winding that are galvanically isolated from one another. The primary winding may be coupled to circuits on the input side of the power converter, such as the power switch. The secondary winding may be coupled to circuits on the output side of the power converter that deliver the regulated output voltage to the electrical load.

The power switch (e.g., a high voltage power switch) may be coupled to the primary winding of the energy transfer element to control current through the primary winding. The control circuits of the power converter may sense the output voltage and control the state of the power switch to control the transfer of energy from the primary winding to the secondary winding in response to the sensed output voltage.

BRIEF DESCRIPTION OF THE DRAWINGS

Non-limiting and non-exhaustive embodiments of the present disclosure are described with reference to the following figures, wherein like reference numerals may refer to like parts throughout the various views.

FIG. 8A is a functional block diagram of an example integrated circuit package that includes a magnetically coupled communication link.

FIG. 8B is a functional block diagram of an example integrated circuit package that includes an optically coupled communication link.

Figure 1:
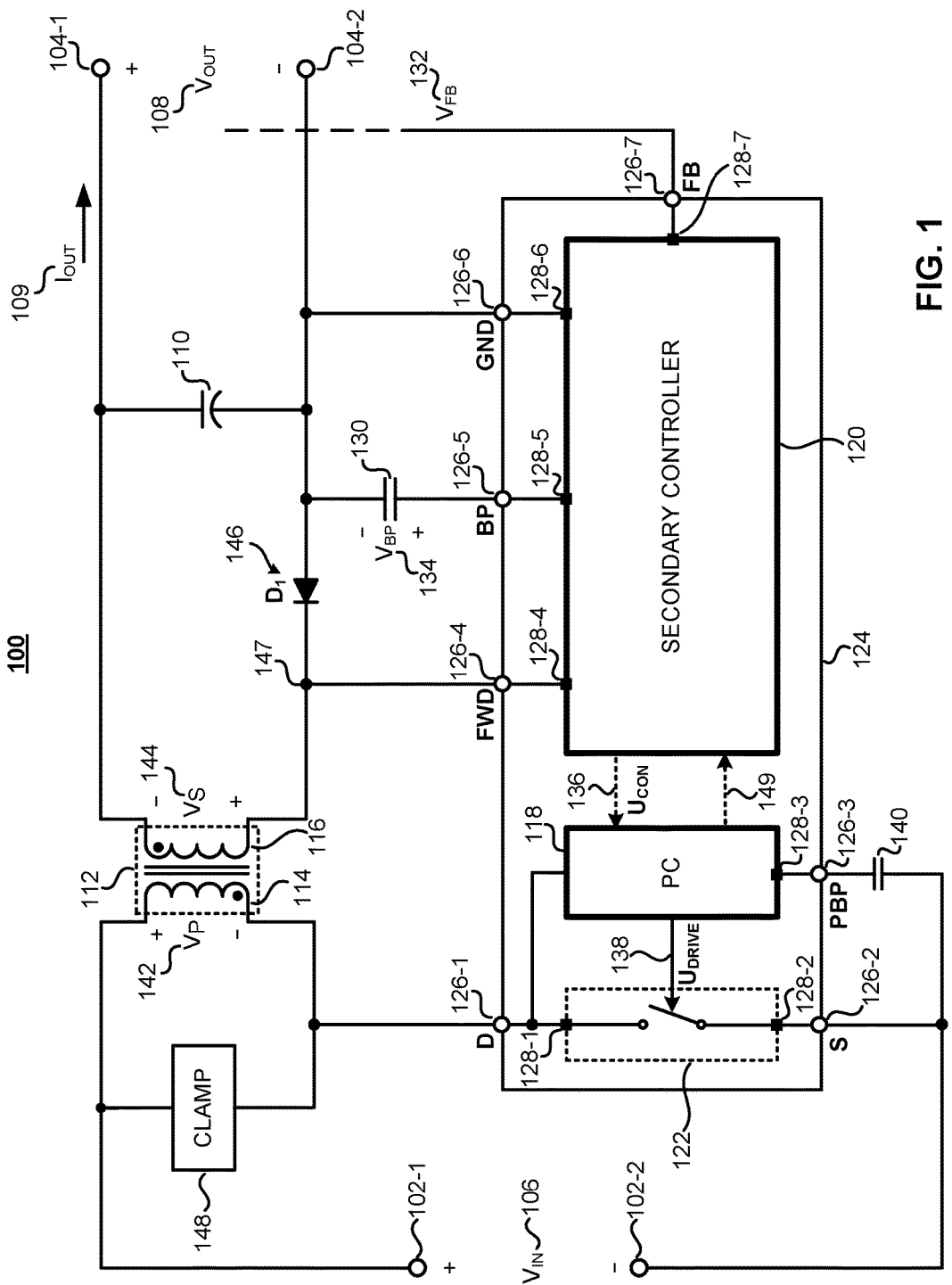
FIG. 1 is a schematic diagram of an example isolated power converter including a primary controller, a secondary controller, and a power switch.

Corresponding reference characters may indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in commercially feasible embodiments are often not depicted in order to facilitate a less obstructed view of the various embodiments of the present disclosure.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures, or characteristics may be combined in any suitable combinations and/or subcombinations in one or more embodiments or examples. Particular features, structures, or characteristics may be included in an integrated circuit, an electronic circuit, a combinational logic circuit, or other suitable components that provide the described functionality.

A power converter according to the present disclosure includes a primary controller and a secondary controller that are galvanically isolated from one another, e.g., by a communication link. The primary and secondary controllers may also be galvanically isolated from one another by an energy transfer element (e.g., a coupled inductor) in some examples, depending on the power converter topology.

The primary controller is coupled to drive a power switch on the primary side of the power converter to control the transfer of energy from the primary winding of the energy transfer element to the secondary winding of the energy transfer element. The secondary controller is coupled to circuit components on the secondary side of the power converter in order to sense an output quantity of the power converter. Although the primary controller and the secondary controller are galvanically isolated from one another, in some circumstances, the secondary controller may transmit signals to the primary controller via a communication link to control how the primary controller switches the power switch. For example, the secondary controller may transmit one or more control signals when an output quantity (e.g., voltage and/or current) of the power converter is less than a desired output quantity. The control signals may cause the primary controller to switch the power switch and transfer energy to the secondary side to increase the value of the output quantity of the power converter.

In general, the primary and secondary controllers may operate to regulate an output quantity (e.g., voltage and/or current) of the power converter that is delivered to a load. For example, the primary and secondary controllers may operate to regulate the output voltage of the power converter to a desired output voltage value in response to a sensed output voltage. Although the primary and secondary controllers may regulate the output voltage in response to a sensed output voltage, in some examples, the primary and secondary controllers may regulate the output voltage and/or the output current of the power converter in response to a sensed output voltage and/or a sensed output current.

The primary controller may receive operating power from the input of the power converter. The secondary side of the power converter includes circuits that receive energy from the primary side of the power converter and provide operating power to the secondary controller. For example, the secondary side of the power converter may include a bypass capacitor that provides operating power to circuits of the secondary controller. In some circumstances (e.g., during startup), some circuits of the secondary controller may not be receiving sufficient operating power. In these circumstances, the primary controller may switch the power switch between an ON and OFF state for a period of time in order to provide sufficient operating power to the secondary controller.

The power converter of the present disclosure may be described as operating in one of a first mode of operation (i.e., a "first mode") and a second mode of operation (i.e., a "second mode"). In the first mode, the primary controller controls the state of the power switch. For example, the primary controller may control when the power switch is set into the ON state (e.g., a short circuit) and when the power switch is set into the OFF state (e.g., an open circuit) during the first mode. In some examples, the secondary controller may not be receiving sufficient operating power during the first mode (e.g., during startup). In these examples, the secondary controller may not transmit control signals to the primary controller. Accordingly, the primary controller may control the state of the power switch without receiving control signals from the secondary controller in the first mode.

In general, the primary controller may control the state of the power switch according to a switching pattern defined by circuits of the primary controller during the first mode. The switching pattern defined by the primary controller may be referred to herein as a "primary switching pattern." The primary switching pattern may define a switching frequency, ON time, a duty cycle, or other switching parameters. The primary switching pattern may include fixed values in some examples. In other examples, the primary controller may update the primary switching pattern during operation.

During the second mode, the secondary controller controls the state of the power switch. For example, the secondary controller may control when the power switch transitions from the OFF state to the ON state. As described herein, the secondary controller transmits control signals to the primary controller that cause the primary controller to set the power switch into the ON state in response to each of the control signals. Put another way, the primary controller may be coupled to set the power switch into the ON state in response to each control signal received from the secondary controller during the second mode. After the primary controller switches the power switch into the ON state in response to a control signal, the primary controller may switch the power switch back into the OFF state in response to a detected turn-off condition. A turn-off condition may include a threshold amount of power switch current and/or a threshold ON time of the power switch. As described herein, during the second mode, the secondary controller may transmit control signals when an output voltage of the power converter is less than the desired output voltage value in order to increase the output voltage of the power converter.

The power converter may transition between the first and second modes. The operations performed by the primary controller and/or the secondary controller to transition the power converter between the first and second modes may be referred to herein as "transition operations." In some examples, the primary and secondary controllers may implement a transition operation in order to transition from the first mode to the second mode. In other words, the primary and secondary controllers may implement a transition operation to transfer control of the power switch from the primary controller to the secondary controller. A variety of different transition operations are described herein.

Operation of the primary and secondary controllers during and after startup of the power converter is now described. Startup may refer to the period of time starting from when an input voltage is applied to the power converter until the secondary controller begins operation. At the beginning of startup, the primary controller may receive operating power from the input of the power converter while the secondary controller may not receive sufficient operating power because the bypass capacitor on the secondary side may be insufficiently charged. Accordingly, the primary controller may operate while the secondary controller is powered down.

During startup, the power converter may operate in the first mode in which the primary controller controls the state of the power switch. For example, the primary controller may control the state of the power switch according to the primary switching pattern defined by circuits of the primary controller. In some examples, the primary switching pattern may have a set switching frequency, power switch ON time, duty cycle, or other switching parameter.

The primary controller may control switching of the power switch during startup in order to transfer energy to the secondary side of the power converter to charge the bypass capacitor. The bypass capacitor may be charged to a voltage that is sufficient to operate the secondary controller after a period of time during which the primary controller controls switching of the power switch. The secondary controller may begin operating when the voltage across the bypass capacitor (i.e., bypass voltage) has reached a voltage that is sufficient to operate the circuits (e.g., logic and or analog circuits) of the secondary controller.

After the secondary controller has powered up, the secondary controller may decide to take control of the power switch from the primary controller. In some examples, the secondary controller may sense parameters (e.g., bypass voltage and/or output voltage) on the secondary side to determine whether the power converter is operating in a manner that allows the secondary controller to reliably perform a transition operation to take control of the power switch. For example, the secondary controller may decide to take control of the power switch when the bypass voltage and/or the output voltage are at sufficient levels to prevent powering down of the secondary controller during a transition operation in which the primary controller temporarily refrains from switching the power switch according to the primary switching pattern.

The secondary controller may initiate a transition operation with the primary controller to take control of the power switch from the primary controller. Put another way, the secondary controller may initiate a transition operation in order to take control of when the power switch is set into the ON state. The primary and secondary controllers may be configured to transfer control from the primary controller to the secondary controller in a variety of different ways.

A transition operation for transitioning from the first mode to the second mode may include the transmission of one or more control signals by the secondary controller. In some examples, the secondary controller may detect switching of the power switch and schedule transmission of the one or more control signals relative to the switching of the power switch. In other examples, the secondary controller may not schedule the one or more control signals relative to the switching of the power switch, but instead, the secondary controller may transmit the one or more control signals without monitoring switching of the power switch. Although transition operations illustrated and described herein include the transmission of control signals from the secondary controller to the primary controller, it is contemplated that in some implementations the secondary controller may transmit signals to the primary controller that differ from the control signals during a transition operation. For example, to initiate and/or complete the transition operation, the secondary controller may transmit signals that differ from the control signals in amplitude, duration, frequency content, or other parameters.

In some examples, the primary controller may acknowledge receipt of the one or more transmitted control signals. For example, the primary controller may adjust the switching pattern of the power switch to indicate to the secondary controller that the one or more control signals were received. In examples where the primary controller may communicate with the secondary controller via the communication link, the primary controller may transmit one or more signals back to the secondary controller via the communication link to acknowledge the receipt of the one or more control signals transmitted by the secondary controller. A variety of different example transition operations are now described.

In one example, the secondary controller may transmit a single control signal to the primary controller to indicate that the secondary controller is taking control of the power switch. In this example, the primary controller may cease switching of the power switch according to the primary switching pattern in response to the single control signal. The primary controller may then wait for subsequent control signals and switch the power switch into the ON state in response to each of the subsequent control signals. Although the secondary controller may indicate taking control of the power switch using a single control signal in some implementations, in other implementations the secondary controller may send multiple control signals to indicate that it is taking control of the power switch. In these implementations, the primary controller may cease switching the power switch according to the primary switching pattern in response to the multiple control signals. The primary controller may then begin setting the power switch into the ON state in response to each of the subsequently received control signals.

In some examples, the secondary controller may schedule the transmission of the one or more control signals relative to a detected switching event of the power switch. For example, with respect to FIGS. 7A-7B, the secondary controller may detect when the power switch switches to the OFF state and transmit a control signal within a window of time after the power switch has been set into the OFF state. In these examples, the secondary controller may monitor a voltage developed on the secondary side (e.g., at a node of the secondary winding) to determine when the power switch switches states. After the primary controller receives the one or more control signals that are scheduled relative to switching events of the power switch, the primary controller may cease switching according to the primary switching pattern and wait for subsequent control signals. The primary controller may then set the power switch into the ON state in response to each of the subsequent control signals. Although the secondary controller may schedule the transmission of control signals relative to switching events of the power switch in some examples, as described above, the secondary controller may not schedule the transmission of control signals relative to switching events of the power switch in other examples.

In some examples, the primary controller may acknowledge receipt of the control signals transmitted by the secondary controller. For example, the primary controller may acknowledge receipt of the control signals by adjusting the switching pattern of the power switch to be different than the primary switching pattern. In one example, the primary controller acknowledges receipt of the control signals by ceasing switching of the power switch for a quiet period in response to receiving one or more control signals from the secondary controller. In other examples, the primary controller may acknowledge receipt of the one or more control signals by increasing or decreasing the rate at which the power switch is switched relative to the rate at which the power switch was switched according to the primary switching pattern.

In examples where the primary controller acknowledges receipt of the control signals, the primary controller may cease switching the power switch according to the primary switching pattern after acknowledging receipt of the control signals. The primary controller may then wait for subsequent control signals and switch the power switch into the ON state in response to each of the subsequent control signals. The secondary controller may begin transmitting control signals to the primary controller after the secondary controller detects acknowledgement (e.g., the modified switching pattern) by the primary controller.

Although the primary controller may acknowledge receipt of the one or more control signals by modifying the switching pattern of the power switch, in some examples, the primary controller may acknowledge receipt of the one or more control signals in other ways. For example, if the communication link between the primary and secondary controller allows for transmission of signals from the primary controller to the secondary controller, the primary controller may acknowledge receipt of the one or more control signals by transmitting an acknowledgement signal back to the secondary controller via the communication link. In this example, the primary controller may cease switching the power switch upon sending the acknowledgement signal to the secondary controller and wait for subsequent control signals. The secondary controller may begin generating control signals to control the state of the power switch after the secondary controller receives the acknowledgement from the primary controller via the communication link. The primary controller may set the power switch into the ON state in response to the subsequently received control signals.

The power converter may be operating in the second mode after a transition operation from the first mode is completed. As described above, the secondary controller may transmit control signals to the primary controller to control the state of the power switch during the second mode. In response to each of the control signals, the primary controller may set the power switch into the ON state and subsequently set the power switch into the OFF state in response to detection of a turn-off condition (e.g., a threshold amount of switch current and/or a threshold ON time of the power switch). While the power converter is in the second mode, the secondary controller may transmit control signals when an output voltage of the power converter is less than the desired output voltage value in order to increase the output voltage of the power converter. The secondary controller may refrain from transmitting control signals in the second mode when the output voltage of the power converter is greater than the desired output voltage value.

During normal operation, the power converter may remain in the second mode after transitioning from the first mode to the second mode after startup. However, in some examples, the power converter may transition from the second mode back to the first mode. Put another way, the primary controller may take control of the power switch back from the secondary controller in some circumstances. The primary controller may take control of the power switch from the secondary controller in a variety of different circumstances described hereinafter.

In some examples, the primary controller may take control of the power switch from the secondary controller when the primary controller detects that the secondary controller is experiencing potential abnormal operating conditions. The primary controller may determine that the secondary controller is experiencing potential abnormal operating conditions based on a number of control signals received over a period of time. In one example, if the primary controller does not receive a control signal for a period of time, the primary controller may determine that the secondary controller may be experiencing abnormal operating conditions, such as an inoperable communication link or a condition that resulted in the output voltage being maintained above the desired output voltage value for an excessive period of time. In another example, if the primary controller is receiving an excessive number of control signals over a period of time, the primary controller may determine that the secondary controller may be experiencing potential abnormal operation conditions, such as a short circuit at the output of the power converter.

The primary controller may take control of the power switch in circumstances where the primary controller fails to receive a control signal for a threshold amount of time. In some examples, the primary controller may begin controlling the power switch according to the primary switching pattern. Controlling the power switch according to the primary switching pattern may transfer energy to the secondary side of the power converter and prevent the output voltage of the power converter from dropping below the desired output voltage value. Additionally, controlling the power switch according to the primary switching pattern may prevent powering down of the secondary controller. After the primary controller takes control of the power switch from the secondary controller, the secondary controller may initiate a transition operation at a later time to regain control of the power switch from the primary side.

In other examples, the primary controller may maintain the power switch in the OFF state when the primary controller fails to receive a control signal for a threshold amount of time. The primary controller may maintain the power switch in the OFF state in order to allow the secondary controller to lose operating power. The primary controller may then return to switching the power switch (e.g., according to the primary switching pattern) after a period of time has elapsed that is sufficient to cause the secondary controller to power down. The secondary controller may then initiate a transition operation to take back control of the power switch when the secondary controller is powered back on.

In circumstances where the primary controller receives an excessive number (e.g., greater than a threshold number) of control signals over a period of time, the primary controller may ignore the control signals and maintain the power switch in the OFF state. In other words, the primary controller may take control of the power switch from the secondary side and maintain the power switch in the OFF state when an excessive number of control signals are received over a period of time. Maintaining the power switch in the OFF state for a sufficient amount of time may result in the secondary controller losing operating power. For example, the bypass capacitor may discharge if the power switch is maintained in the OFF state. In these examples, the primary controller may return to switching the power switch (e.g., according to the primary switching pattern) after a period of time has elapsed that is sufficient to cause the secondary controller to power down.

The bypass capacitor may be recharged after the primary controller resumes switching the power switch. The secondary controller may begin operating once the bypass capacitor has been charged to a sufficient level. After the secondary controller begins operating, the secondary controller may decide to take control of the power switch as described above. For example, the secondary controller may perform a transition operation in order to take control of the power switch. In one example, when the secondary controller begins sending excessive signals after powering back up, the primary controller may again take control of the power switch. This process may be repeated until the power converter is disconnected from the power source and the primary controller powers down.

An excessive number of control signals over a time period may be transmitted in circumstances where a short circuit is present at the output of the power converter. In other examples, where a short circuit is not present at the output, an excessive number of control signals being received by the primary controller may cause the primary controller to transfer an excessive amount of energy to the secondary side. Accordingly, the primary controller may prevent the transfer of an excessive amount of energy to the secondary side by taking control of the power switch and maintaining the power switch in the OFF state in response to the receipt of an excessive number of control signals over a period of time.

Accordingly, as described above, the primary controller may be coupled to transition from the second mode to the first mode in response to a number of control signals received from the secondary controller. For example, the primary controller may be coupled to transition from the second mode to the first mode when the primary controller detects an excessive number of control signals over a period of time and/or an absence of control signals within a threshold amount of time. In examples where the primary controller transitions from the first mode to the second mode, the secondary controller may detect the transition of the primary controller from the first mode to the second mode. For example, the secondary controller may detect changes in the switching pattern of the power switch when the primary controller transitions from the first mode to the second mode.

In some examples, the secondary controller may be coupled to acknowledge the transition of the primary controller from the second mode to the first mode. For example, the secondary controller may be coupled to acknowledge the transition of the primary controller by modifying the transmission of control signals to the primary controller. In an example where the secondary controller is sending an excessive number of control signals over a period of time, the secondary controller may acknowledge the transition of the primary controller from the second mode to the first mode by ceasing the transmission of control signals upon detecting the transition of the primary controller to the first mode. In an example where the primary controller detects an absence of control signals within a threshold amount of time, the secondary controller may acknowledge the transition of the primary controller to the first mode by initiating a subsequent transition operation.

Although the primary and secondary controllers may be included in isolated power converters, in other examples, the primary and secondary controllers may be included in a non-isolated power converter in which the input side (e.g., input terminals) of the non-isolated power converter is not galvanically isolated from the output side (e.g., output terminals). When used in a non-isolated power converter, the primary and secondary controllers may be galvanically isolated from one another (e.g., by a communication link) although the input side and the output side of the non-isolated power converter are not galvanically isolated from one another. An example implementation of the primary and secondary controllers is illustrated and described in a non-isolated buck converter topology with reference to FIG. 9.

Figure 2:
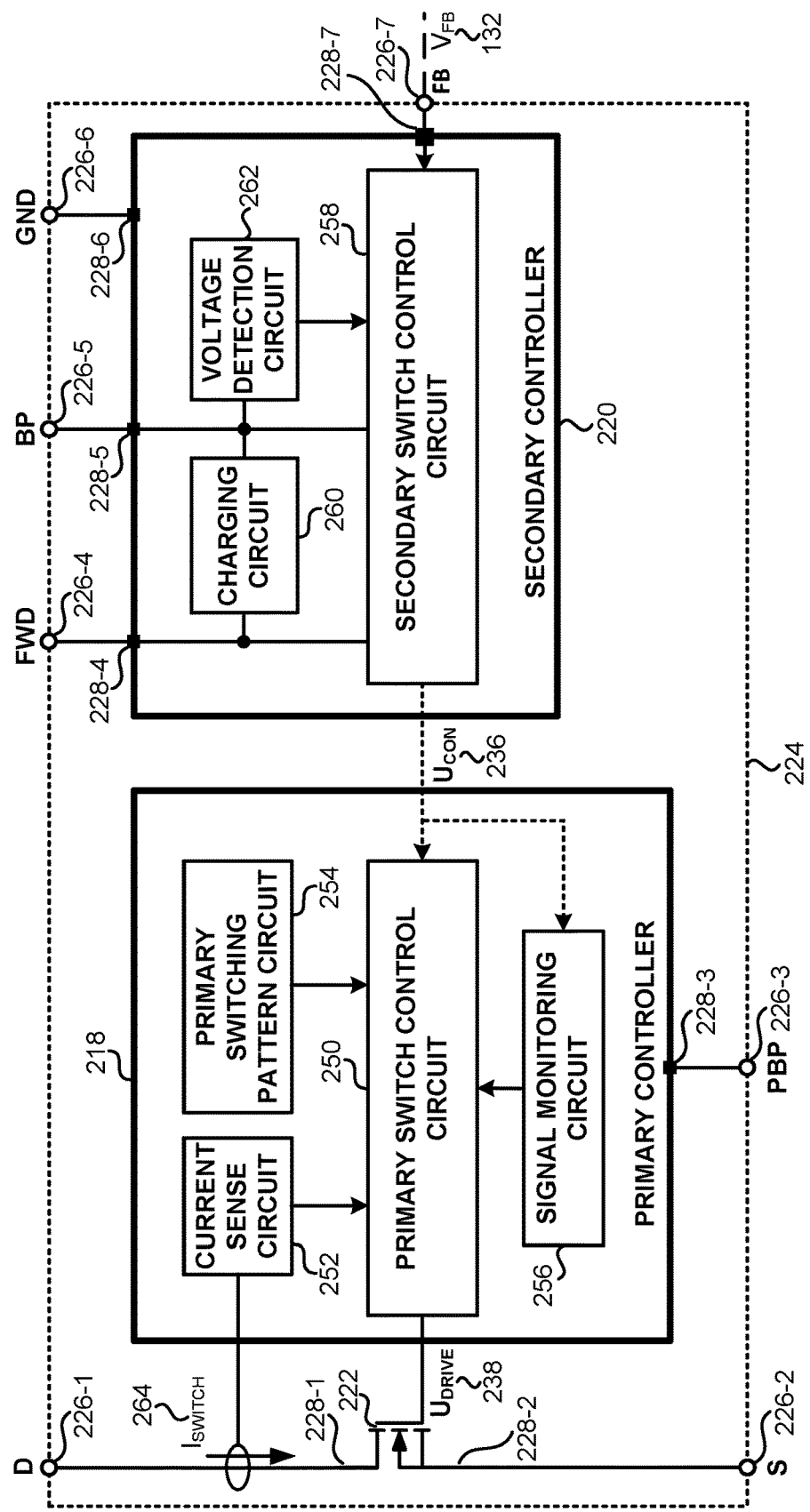
FIG. 2 is a functional block diagram of an example integrated circuit package that includes a primary controller, a secondary controller, and a power switch.
Figure 6:
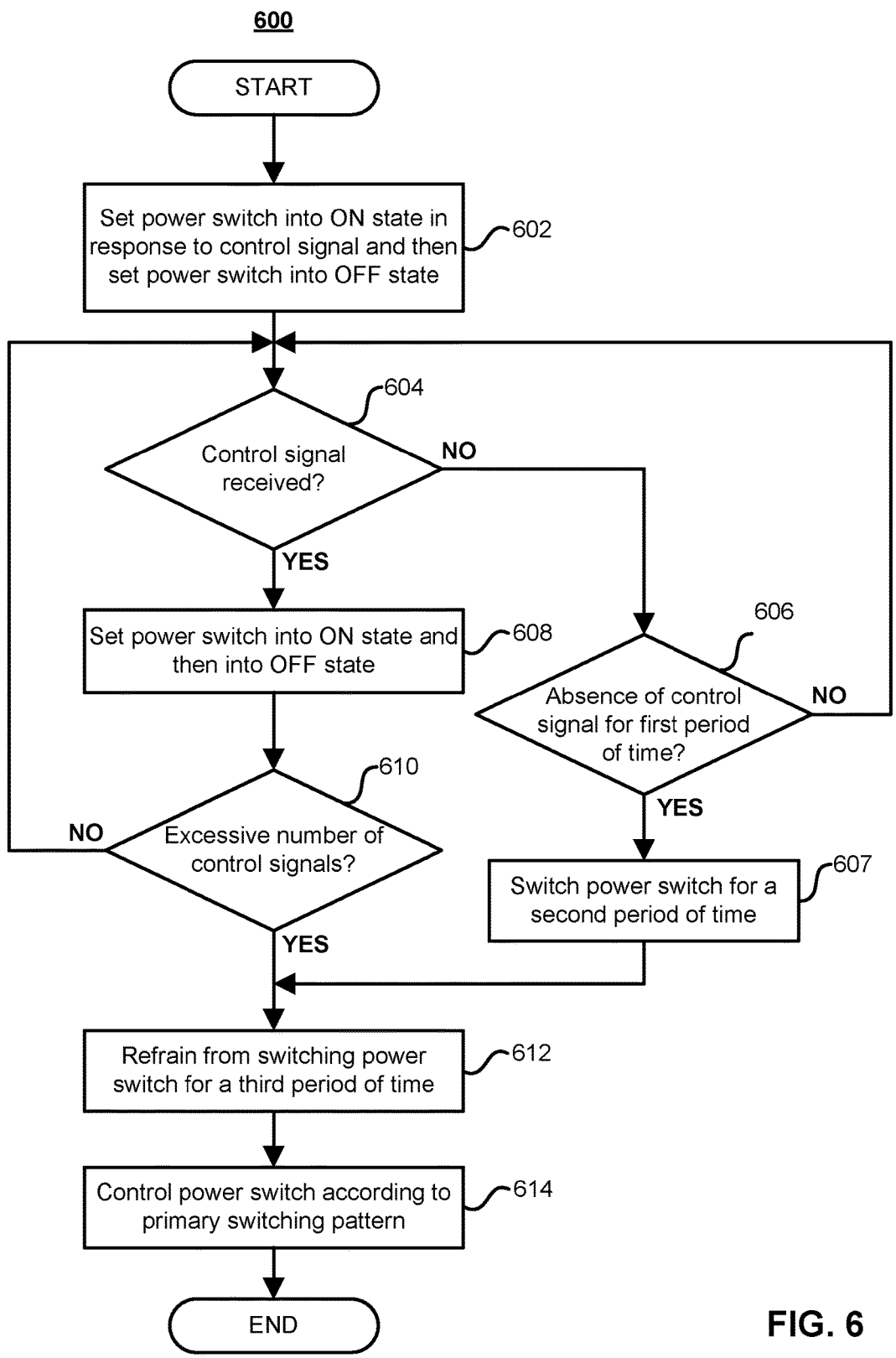
FIG. 6 is a flow diagram that describes operation of a primary controller that detects potential abnormal operating conditions in a secondary controller.
Figure 7A:
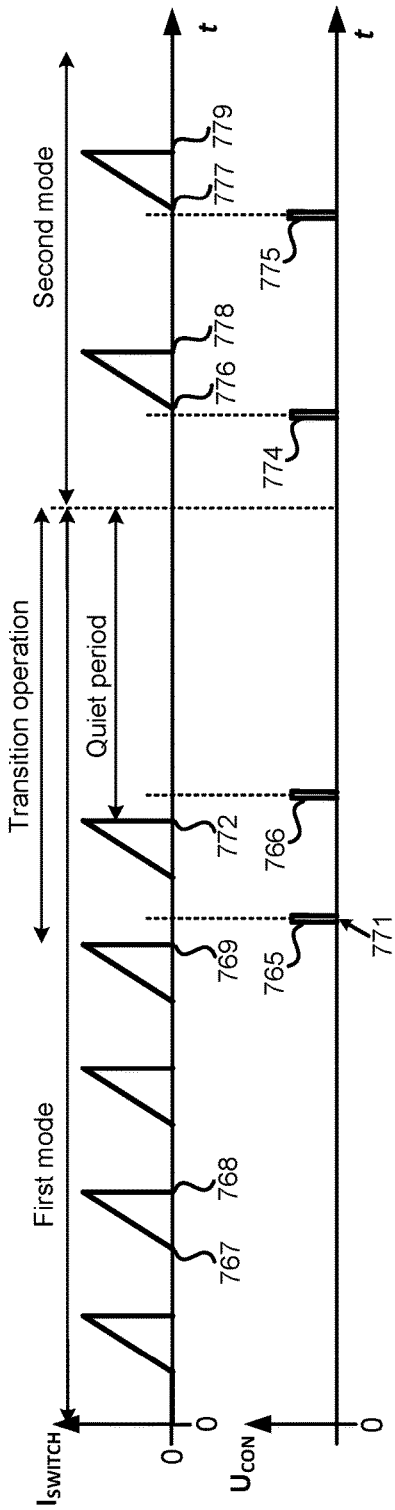
FIGS. 7A-7B illustrate operation of primary and secondary controllers during a first mode of operation, a transition operation, and a second mode of operation.
Figure 7B:
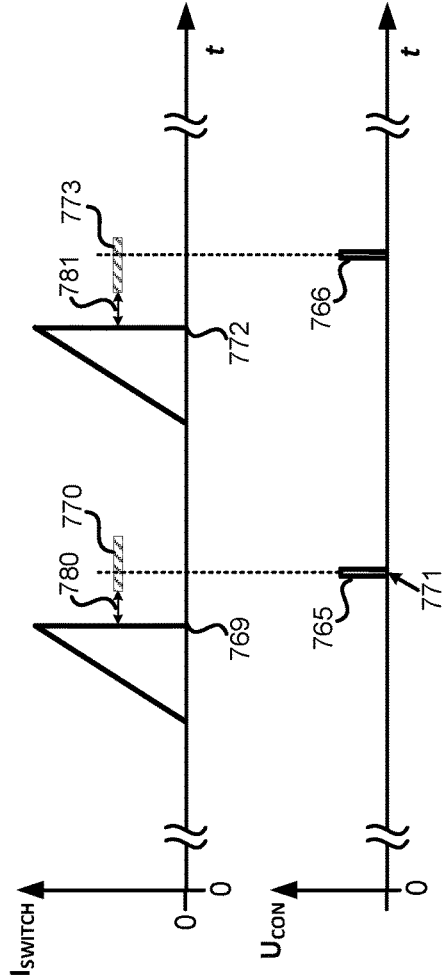
Figure 9:
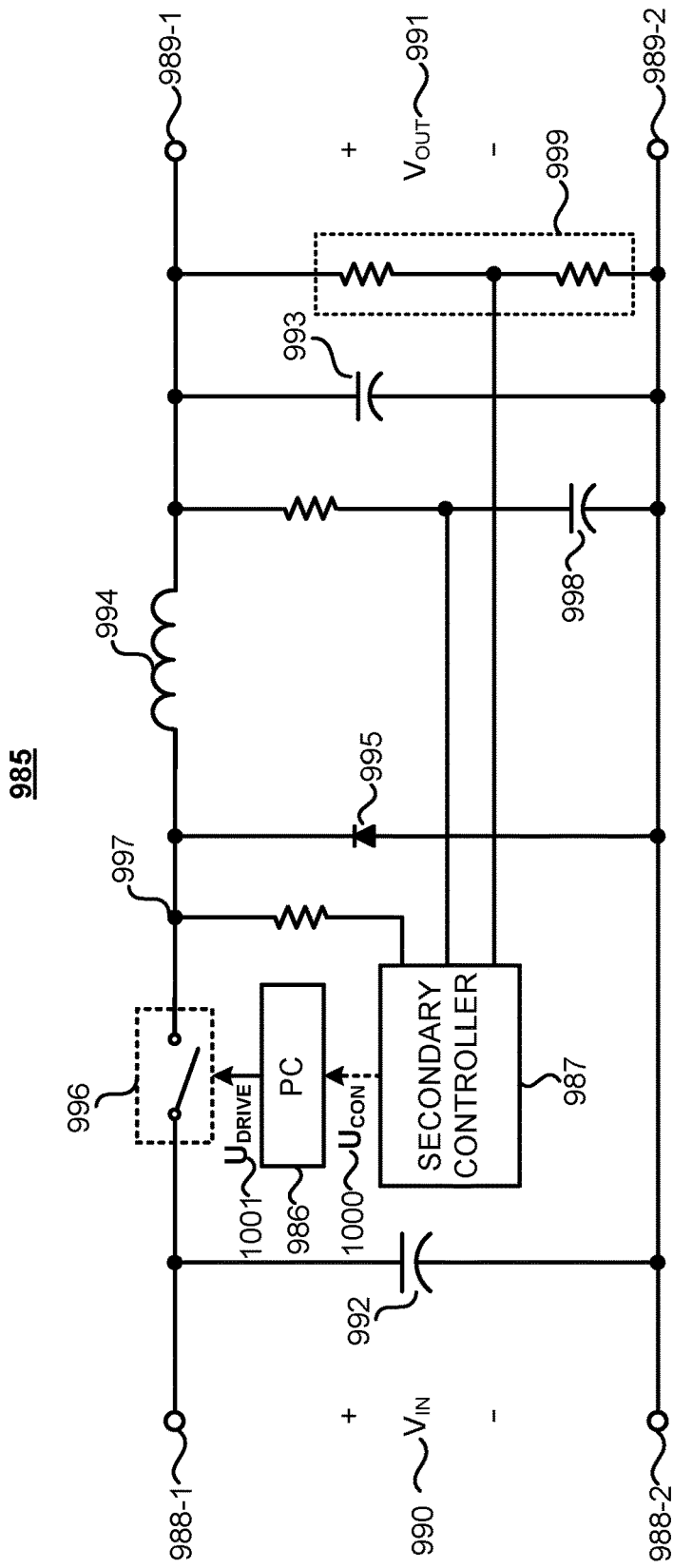
FIG. 9 is a schematic diagram of an example non-isolated power converter that includes an example primary controller and an example secondary controller.

An example power converter that operates in one of a first mode of operation and a second mode of operation is now described with reference to FIGS. 1-9. FIG. 1 shows an example isolated power converter that includes a primary controller and a secondary controller that operate to regulate an output quantity of the isolated power converter. FIG. 2 illustrates a more detailed view of example primary and secondary controllers. FIGS. 3-6 are flow diagrams that illustrate operation of example primary and secondary controllers. FIGS. 7A-7B illustrate waveforms generated during the first mode, a transition operation, and the second mode. FIGS. 8A-8B show example communication links through which the secondary controller and primary controller may communicate. FIG. 9 shows a non-isolated power converter that includes example primary and secondary controllers.

FIG. 1 is a schematic diagram of an example power converter 100 which may operate in one of a first mode and a second mode according to the present disclosure. Example power converter 100 is an isolated switch mode power converter having a flyback topology. Although primary side control circuit 118 and secondary side control circuit 120 of FIG. 1 are included in an isolated power converter, in other examples, primary side control circuit 118 and secondary side control circuit 120 may be included in non-isolated power converters (e.g., a non-isolated buck converter as shown in FIG. 9). When used in non-isolated power converters, the galvanic isolation between the primary side control circuit and the secondary side control circuit allows for voltage differences between the output and the power switch. In other words, the galvanic isolation allows the power switch to float relative to the output terminals. In some examples, this may eliminate the need for complex level shift circuitry that may otherwise be required between the secondary side control circuit and the primary side control circuit.

Power converter 100 includes input terminals 102-1, 102-2 (collectively "input terminals 102") and output terminals 104-1, 104-2 (collectively "output terminals 104"). Input terminals 102 are coupled to receive an input voltage $V_{IN}$ 106, which may be a rectified and filtered ac voltage. For example, input terminals 102 may be coupled to a full-bridge rectifier (not shown) and a filter capacitance (not shown) that are coupled to rectify and filter an ac voltage received from an ac voltage source. In one example, input voltage $V_{IN}$ 106 may be a time-varying dc voltage. As shown, $V_{IN}$ 106 is referenced to input terminal 102-2, which may be referred to as an "input return 102-2."

Output terminals 104 provide an output voltage $V_{OUT}$ 108 to an electrical load (not shown). After startup of power converter 100, power converter 100 may regulate the value of output voltage $V_{OUT}$ 108 to a desired output voltage value (e.g., 5 to 12 V dc). Startup may be a period of time starting from when $V_{IN}$ 106 is applied to power converter 100 until the control circuits (e.g., secondary controller 120) of power converter 100 begin operating to regulate output voltage $V_{OUT}$ 108 of power converter 100. Accordingly, output voltage $V_{OUT}$ 108 may be referred to as a "regulated output voltage." Output terminals 104 are coupled to an output capacitor 110 to smooth out regulated output voltage $V_{OUT}$ 108. As shown, output voltage $V_{OUT}$ 108 is referenced to output terminal 104-2, which may be referred to as an "output return 104-2."

Power converter 100 includes an energy transfer element 112. Energy transfer element 112 includes a primary winding 114 and a secondary winding 116. Energy transfer element 112 is coupled to transfer energy from primary winding 114 to secondary winding 116. In one example, energy transfer element 112 may be a coupled inductor. Circuits that are electrically coupled between input terminals 102 and primary winding 114 may be referred to as the "primary side" of power converter 100. Circuits that are electrically coupled between secondary winding 116 and output terminals 104 may be referred to as the "secondary side" of power converter 100. Energy transfer element 112 provides galvanic isolation between circuits on the primary side of power converter 100 and circuits on the secondary side of power converter 100. Accordingly, a dc voltage applied between the primary side and the secondary side of power converter 100 will produce substantially zero current.

Power converter 100 includes a primary side control circuit 118 (hereinafter "primary controller 118"), a secondary side control circuit 120 (hereinafter "secondary controller 120"), and a power switch 122. Primary controller 118, secondary controller 120, and power switch 122 are included in an integrated circuit package 124, which is illustrated as a box in FIG. 1.

In one example, integrated circuit package 124 may include a first integrated circuit die and a second integrated circuit die within an encapsulation. An encapsulation may refer to an encasing or molding that surrounds or encloses one or more integrated circuit dice and a portion of a lead frame. The first integrated circuit die may include primary controller 118 and power switch 122. The second integrated circuit die may include secondary controller 120. In another example, integrated circuit package 124 may include three integrated circuit dice within an encapsulation. For example, integrated circuit package 124 may include a first integrated circuit die that includes power switch 122, a second integrated circuit die that includes primary controller 118, and a third integrated circuit die that includes secondary controller 120.

The integrated circuit dice including primary controller 118 and secondary controller 120 are galvanically isolated from one another. Accordingly, secondary controller 120 is galvanically isolated from primary controller 118 and power switch 122. Although primary controller 118 and secondary controller 120 are galvanically isolated from one another, primary controller 118 and secondary controller 120 may communicate with one another. For example, secondary controller 120 may communicate with primary controller 118 via a communication link. In one example, the communication link may be a magnetically coupled communication link. An example magnetically coupled communication link is described with reference to FIG. 8A. In another example, secondary controller 120 may communicate with primary controller 118 through an optically coupled communication link. An example optically coupled communication link is described with reference to FIG. 8B. In other examples, secondary controller 120 may communicate with primary controller 118 through other types of communication links, such as a capacitive communication link.

Although primary controller 118, secondary controller 120, and power switch 122 are illustrated as included in a single integrated circuit package, in other examples, one or more of primary controller 118, secondary controller 120, and power switch 122 may be located outside of the illustrated integrated circuit package. For example, power switch 122 may be included in an integrated circuit package that is separate from another integrated circuit package that includes both primary controller 118 and secondary controller 120.

Circuits external to integrated circuit package 124 may electrically couple to package terminals D 126-1, S 126-2, PBP 126-3, FWD 126-4, BP 126-5, GND 126-6, and FB 126-7 (collectively "package terminals 126") of integrated circuit package 124. Package terminals 126 of integrated circuit package 124 may include conductive pins and/or conductive pads for connection to circuits external to integrated circuit package 124.

Package terminals 126 may connect to terminals (e.g., on integrated circuit die) of power switch 122, primary controller 118, and secondary controller 120 included inside encapsulation of integrated circuit package 124. Power switch 122 includes terminals D 128-1 and S 128-2. Primary controller 118 includes terminal PBP 128-3. Secondary controller 120 includes terminals FWD 128-4, BP 128-5, GND 128-6, and FB 128-7. Terminals D 128-1, S 128-2, PBP 128-3, FWD 128-4, BP 128-5, GND 128-6, and FB 128-7 may be conductive connections included on the integrated circuit die that include power switch 122, primary controller 118, and secondary controller 120. GND terminal 128-6 is coupled to output terminal 104-2. In one example, GND terminal 128-6 may be the output return for secondary controller 120.

Primary controller 118 is coupled to circuit components of the primary side of power converter 100, such as power switch 122. Secondary controller 120 is coupled to circuit components of the secondary side of power converter 100. For example, secondary controller 120 may be coupled to secondary winding 116 and a bypass capacitor 130. Secondary controller 120 may also be coupled to output terminals 104 via feedback circuits (not shown) that allow secondary controller 120 to sense an output quantity of power converter 100 (e.g., output voltage $V_{OUT}$ 108 and/or output current $I_{OUT}$ 109). For example, power converter 100 of FIG. 1 may include feedback circuits between output terminals 104 and feedback terminal FB 126-7 that generate a feedback voltage $V_{FB}$ 132 that is representative of output voltage $V_{OUT}$ 108. Although power converter 100 of FIG. 1 may include feedback circuits that generate feedback voltage $V_{FB}$ 132, in other examples, power converter 100 may include circuits that generate a feedback current that is representative of output current $I_{OUT}$ 109. Primary controller 118 and secondary controller 120 control circuits of power converter 100 (e.g., power switch 122) to control energy transfer from input terminals 102 to output terminals 104.

Secondary controller 120 receives power from the secondary side of power converter 100. For example, secondary controller 120 may receive power from bypass capacitor 130 which is coupled to secondary controller 120 at bypass terminal BP 128-5 and ground terminal GND 128-6. Bypass capacitor 130 may supply power to circuits of secondary controller 120 such as voltage detection circuit 262 (FIG. 2) and secondary switch control circuit 258 (FIG. 2). Secondary controller 120 may include circuits (e.g., charging circuit 260) that charge bypass capacitor 130 from forward terminal FWD 128-4 and that regulate bypass voltage $V_{BP}$ 134 across bypass capacitor 130.

Although primary controller 118 and secondary controller 120 are galvanically isolated from one another, secondary controller 120 may transmit a control signal $U_{CON}$ 136 to primary controller 118. For example, secondary controller 120 may transmit control signal $U_{CON}$ 136 via a communication link, e.g., a magnetic, capacitive, or an optical communication link. As described hereinafter, primary controller 118 may set power switch 122 into an ON state in response to a control signal $U_{CON}$ 136 received from secondary controller 120 during the second mode.

Power switch 122 may be a high voltage power switch, which may have a breakdown voltage in the range of 700-800 V. In one example, power switch 122 may be a power metal-oxide-semiconductor field-effect transistor (power MOSFET), as illustrated in FIG. 2. Power switch 122 is coupled to primary winding 114 and input return 102-2. In examples where power switch 122 is a power MOSFET, the drain of the power MOSFET may be coupled to drain terminal D 128-1 and the source of the power MOSFET may be coupled to source terminal S 128-2, as illustrated in FIG. 2.

Primary controller 118 controls current through power switch 122 and primary winding 114 by controlling the state of power switch 122. Current through power switch 122 may be referred to herein as "switch current." In general, power switch 122 may be in an "ON" state (e.g., a closed switch) or an "OFF" state (e.g., an open switch), in response to a switch drive signal $U_{DRIVE}$ 138 generated by primary controller 118. When power switch 122 is in the ON state (e.g., a closed switch), power switch 122 may conduct current. When power switch 122 is in the OFF state (e.g., an open switch), power switch 122 may not conduct current when a voltage is applied across power switch 122.

Primary controller 118 generates switch drive signal $U_{DRIVE}$ 138 to control the state of power switch 122. In an example where power switch 122 is a power MOSFET, primary controller 118 may be coupled to the gate of the power MOSFET, as illustrated in FIG. 2. In this example, primary controller 118 applies a gate-to-source voltage that is greater than the threshold voltage of the power MOSFET to set the power MOSFET into the ON state. Primary controller 118 applies a gate-to-source voltage that is less than the threshold voltage of the power MOSFET to set the power MOSFET into the OFF state.

Primary controller 118 receives operating power from input terminals 102 and/or primary bypass capacitor 140. In one example, primary controller 118 may also receive operating power from a low voltage winding (not shown in FIG. 1) forming part of energy transfer element 112. Primary bypass capacitor 140 may store energy received from input terminals 102 when input voltage $V_{IN}$ 106 is provided at input terminals 102. Energy stored on primary bypass capacitor 140 may be used as operating power by primary controller 118, e.g., to generate switch drive signal $U_{DRIVE}$ 138.

When power switch 122 is in the ON state, current through primary winding 114 increases, storing energy in energy transfer element 112. Additionally, a primary winding voltage $V_P$ 142 with a first polarity develops across primary winding 114 while power switch 122 is in the ON state. A secondary winding voltage $V_S$ 144 of opposite polarity with respect to primary winding voltage $V_P$ 142 develops across secondary winding 116 while power switch 122 is in the ON state. Diode $D_1$ 146 may be reverse-biased when power switch 122 is in the ON state.

When power switch 122 is in the OFF state, power switch 122 may act as an open circuit and substantially prevent current through power switch 122. When power switch 122 switches from the ON state to the OFF state, the polarity of secondary winding voltage $V_S$ 144 reverses and energy is transferred to output capacitor 110, which provides power to an electrical load connected to output terminals 104. Diode $D_1$ 146 may allow charging of output capacitor 110 and the delivery of energy to a load after power switch 122 transitions to the OFF state. Although a passive rectification component (i.e., diode $D_1$ 146) is illustrated in FIG. 1, in other examples, power converter 100 may include a synchronous rectification switch (e.g., a MOSFET) that may be controlled by secondary controller 120. In some examples, a synchronous rectification switch may be integrated as a separate die inside integrated circuit package 124. Clamp circuit 148 is coupled to primary winding 114 of energy transfer element 112 to limit the maximum voltage on power switch 122 when power switch 122 switches between an ON state and an OFF state.

Secondary controller 120 may sense an output quantity of power converter 100 (e.g., output current $I_{OUT}$ 109 and/or output voltage $V_{OUT}$ 108). For example, secondary controller 120 of FIG. 1 senses feedback voltage $V_{FB}$ 132 at feedback terminal FB 128-7 (e.g., with respect to GND terminal 128-6). In one example, feedback voltage $V_{FB}$ 132 sensed at feedback terminal FB 128-7 is a scaled down voltage, e.g., by a resistor divider circuit, that is representative of output voltage $V_{OUT}$ 108 of power converter 100. Although example secondary controller 120 of FIG. 1 senses output voltage $V_{OUT}$ 108 of power converter 100, it is contemplated that, in some examples, secondary controller 120 may sense other output quantities, such as output current $I_{OUT}$ 109 and/or a combination of output voltage $V_{OUT}$ 108 and output current $I_{OUT}$ 109 of power converter 100.

As described herein, primary controller 118 and secondary controller 120 may operate to regulate an output quantity (e.g., output voltage $V_{OUT}$ 108 and/or output current $I_{OUT}$ 109) of power converter 100 after startup. For example, primary controller 118 and secondary controller 120 may operate to regulate output voltage $V_{OUT}$ 108 to a desired output voltage value in response to sensed feedback voltage $V_{FB}$ 132. In general, in circumstances when output voltage $V_{OUT}$ 108 drops to a value that is less than a desired output voltage value, primary controller 118 and secondary controller 120 may operate to increase output voltage $V_{OUT}$ 108 until output voltage $V_{OUT}$ 108 has reached the desired output voltage value. Although primary controller 118 and secondary controller 120 may regulate output voltage $V_{OUT}$ 108 in response to feedback voltage $V_{FB}$ 132, in some examples, primary controller 118 and secondary controller 120 may regulate output voltage $V_{OUT}$ 108 and/or output current $I_{OUT}$ 109 in response to sensed output current $I_{OUT}$ 109 and/or feedback voltage $V_{FB}$ 132.

Power converter 100 may be described as operating in one of a first mode and a second mode. When power converter 100 is operating in the first mode, primary controller 118 and secondary controller 120 may also be described as operating in the first mode. When power converter 100 is in the second mode, primary controller 118 and secondary controller 120 may also be described as operating in the second mode. Operation of primary controller 118 and secondary controller 120 in the first and second modes is described hereinafter during startup and operation of power converter 100.

In the first mode, primary controller 118 controls the state of power switch 122 while secondary controller 120 may be in a powered down state. In general, primary controller 118 may control the state of power switch 122 according to a switching pattern (hereinafter "primary switching pattern") defined by circuits of primary controller 118. For example, primary controller 118 may control when power switch 122 is set into the ON state and when power switch 122 is set into the OFF state according to the primary switching pattern. The primary switching pattern may define a variety of different switching parameters. For example, the primary switching pattern may define a switching frequency, an ON time, a duty cycle, or other switching parameters. In some examples, the primary switching pattern may define when primary controller 118 sets power switch 122 into the ON state, and then primary controller 118 may set power switch 122 into the OFF state in response to one or more turn-off conditions. The primary switching pattern may include fixed values in some examples. In other examples, primary controller 118 may update the primary switching pattern during operation.

In some examples, secondary controller 120 may not be receiving sufficient operating power during the first mode (e.g., during startup). In these examples, secondary controller 120 may not transmit control signals $U_{CON}$ 136 to primary controller 118. Accordingly, primary controller 118 may control the state of power switch 122 without receiving control signals $U_{CON}$ 136 from secondary controller 120 in the first mode.

Energy is transferred to the secondary side of power converter 100 while primary controller 118 controls power switch 122 according to the primary switching pattern during the first mode. Bypass capacitor 130 may be charged towards a voltage that is sufficient to operate secondary controller 120 during the first mode. After a period of time during the first mode, bypass voltage $V_{BP}$ 134 reaches a level that is sufficient to operate the circuits (e.g., logic circuits) of secondary controller 120. After secondary controller 120 has powered up, secondary controller 120 may decide to take control of power switch 122 from primary controller 118.

In summary, primary controller 118 may control the state of power switch 122 while secondary controller 120 is in a powered down state during the first mode. Switching of power switch 122 according to the primary switching pattern may transfer energy to the secondary side so that bypass capacitor 130 is charged to a voltage that is sufficient for operating secondary controller 120. Primary and secondary controllers 118, 120 may operate in the first mode in a variety of different scenarios described herein. In some examples, primary and secondary controllers 118, 120 may operate in the first mode during startup of power converter 100. In other examples described herein, primary controller 118 may refrain from switching power switch 122 during operation in order to power down secondary controller 120. In these examples, primary controller 118 and secondary controller 120 may begin operating in the first mode when primary controller 118 begins switching power switch 122 after secondary controller 120 has powered down.

Power converter 100 may transition from the first mode to the second mode when secondary controller 120 begins operating. The operations performed by primary controller 118 and/or secondary controller 120 to transition from the first mode to the second mode may be referred to as "transition operations." A variety of different transition operations are described hereinafter.

Power converter 100 may be operating in the second mode after completion of a transition operation. During the second mode, secondary controller 120 controls when power switch 122 is set into the ON state. For example, secondary controller 120 transmits control signals $U_{CON}$ 136 to primary controller 118 that cause primary controller 118 to set power switch 122 into the ON state in response to each of control signals $U_{CON}$ 136. Put another way, in the second mode, primary controller 118 may be coupled to set power switch 122 into the ON state in response to each control signal $U_{CON}$ 136 received from secondary controller 120. Accordingly, during the second mode, primary controller 118 may have ceased switching of power switch 122 according to the primary switching pattern. Instead, primary controller 118 sets power switch 122 into the ON state in response to control signals $U_{CON}$ 136 transmitted by secondary controller 120.

After primary controller 118 switches power switch 122 into the ON state in response to a control signal $U_{CON}$ 136, primary controller 118 may determine when to set power switch 122 into the OFF state. For example, primary controller 118 may switch power switch 122 back into the OFF state in response to a detected turn-off condition. In some examples, a turn-off condition may include a threshold amount of switch current and/or a threshold ON time of power switch 122.

During the second mode, secondary controller 120 may transmit a control signal $U_{CON}$ 136 when output voltage $V_{OUT}$ 108 is less than the desired output voltage value in order to increase output voltage $V_{OUT}$ 108. As described above, primary controller 118 sets power switch 122 into the ON state in response to receiving a control signal $U_{CON}$ 136 from secondary controller 120 and subsequently sets power switch 122 into the OFF state, which may then result in a transfer of energy to the secondary side of power converter 100. The transfer of energy to the secondary side may increase output voltage $V_{OUT}$ 108 towards the desired output voltage value. Power switch 122 may then be maintained in the OFF state by primary controller 118 until primary controller 118 receives another control signal $U_{CON}$ 136. During the second mode, secondary controller 120 may refrain from transmitting control signals $U_{CON}$ 136 when output voltage $V_{OUT}$ 108 is greater than the desired output voltage value.

In some examples, control signal $U_{CON}$ 136 may be a pulse that is transmitted by secondary controller 120 and detected by primary controller 118. In these examples, secondary controller 120 may transmit a plurality of consecutive pulses which may be separated by similar or different amounts of time. Primary controller 118 may set power switch 122 into the ON state in response to each of the consecutive pulses. For each pulse, primary controller 118 determines when to set power switch 122 into the OFF state.

Primary controller 118 sets power switch 122 into the OFF state in response to detection of a turn-off condition. In one example, a turn-off condition may include an amount of switch current through power switch 122. In this example, primary controller 118 may sense an amount of switch current when power switch 122 is in the ON state. Primary controller 118 may then set power switch 122 into an OFF state when the switch current reaches a threshold current limit while power switch 122 is in the ON state. In another example, a turn-off condition may include a threshold amount of ON time. In this example, primary controller 118 may be coupled to set power switch 122 into the ON state for the threshold amount of ON time in response to control signal $U_{CON}$ 136, and then set power switch 122 into the OFF state after the threshold amount of ON time has expired. Although turn-off conditions may include a threshold current limit and/or a threshold amount of ON time, it is contemplated that primary controller 118 may set power switch 122 into the OFF state in response to other conditions. The turn-off conditions may be fixed quantities in some examples. In other examples, primary controller 118 may adjust the turn-off conditions.

During startup, primary controller 118 and secondary controller 120 may be operating in the first mode. Primary controller 118 may receive operating power during startup while secondary controller 120 may not initially receive sufficient operating power because bypass capacitor 130 on the secondary side may be insufficiently charged. During startup, primary controller 118 may control the state of power switch 122 while secondary controller 120 is in a powered down state. For example, primary controller 118 may control the state of power switch 122 according to the primary switching pattern. Primary controller 118 may control switching of power switch 122 during startup in order to transfer energy to the secondary side to charge bypass capacitor 130. Secondary controller 120 may begin operating when bypass voltage $V_{BP}$ 134 reaches a voltage that is sufficient to operate secondary controller 120.

After secondary controller 120 has begun operating (i.e., is in an operational state), secondary controller 120 may take control of power switch 122 from primary controller 118. In some examples, the secondary controller 120 may sense parameters (e.g., bypass voltage $V_{BP}$ 134 and/or output voltage $V_{OUT}$ 108) to determine whether to take control of power switch 122. For example, secondary controller 120 may decide to take control of power switch 122 when bypass voltage $V_{BP}$ 134 and/or output voltage $V_{OUT}$ 108 are at sufficient levels to prevent powering down of secondary controller 120 during a transition operation in which primary controller 118 temporarily refrains from switching power switch 122 according to the primary switching pattern, as illustrated in FIGS. 7A-7B.

Secondary controller 120 may initiate a transition operation with primary controller 118 to take control of power switch 122 from primary controller 118. Primary and secondary controllers 118, 120 may be configured to transfer control from primary controller 118 to secondary controller 120 in a variety of different ways.

A transition operation for transitioning primary and secondary controllers 118, 120 from the first mode to the second mode may include the transmission of one or more control signals $U_{CON}$ 136 by secondary controller 120. In some examples, secondary controller 120 may detect switching of power switch 122 and schedule transmission of the one or more control signals $U_{CON}$ 136 relative to switching events of power switch 122 (e.g., ON/OFF or OFF/ON transitions). In other examples, secondary controller 120 may not schedule one or more control signals $U_{CON}$ 136 relative to the switching events of power switch 122. Instead, secondary controller 120 may transmit one or more control signals $U_{CON}$ 136 without monitoring switching of power switch 122.

Although transition operations illustrated and described herein include the transmission of control signals $U_{CON}$ 136 from secondary controller 120 to primary controller 118, it is contemplated that in some implementations secondary controller 120 may transmit signals to primary controller 118 that differ from control signals $U_{CON}$ 136 to initiate and complete a transition operation. For example, to initiate and/or complete a transition operation, secondary controller 120 may transmit signals that differ from control signals $U_{CON}$ 136 in amplitude, duration, frequency content, or other parameters. In one example, the signals transmitted during a transition operation may be different than the example pulses used to illustrate control signals $U_{CON}$ 136 in FIGS. 7A-7B.

In some examples, primary controller 118 may acknowledge receipt of one or more control signals $U_{CON}$ 136 transmitted during a transition operation. For example, primary controller 118 may adjust the switching pattern of power switch 122 to indicate to secondary controller 120 that the one or more control signals $U_{CON}$ 136 were received. In examples where the communication link between primary controller 118 and secondary controller 120 provides for the transmission of signals 149 from primary controller 118 to secondary controller 120, primary controller 118 may transmit one or more signals back to secondary controller 120 via the communication link to acknowledge the receipt of the one or more control signals $U_{CON}$ 136 transmitted by secondary controller 120. A variety of different example transition operations are now described.

In some implementations, secondary controller 120 may transmit a single control signal $U_{CON}$ 136 to primary controller 118 during a transition operation. In this example, primary controller 118 may cease switching of power switch 122 according to the primary switching pattern in response to the single control signal $U_{CON}$ 136. Primary controller may then wait for subsequent control signals $U_{CON}$ 136 and switch power switch 122 into the ON state in response to each of the subsequent control signals $U_{CON}$ 136.

In some implementations, secondary controller 120 may send multiple control signals $U_{CON}$ 136 during a transition operation. In these implementations, primary controller 118 may cease switching of power switch 122 according to the primary switching pattern in response to receiving multiple control signals $U_{CON}$ 136. Primary controller 118 may then begin setting power switch 122 into the ON state in response to each of the subsequently received control signals $U_{CON}$ 136.

In some implementations, secondary controller 120 may schedule the transmission of the one or more control signals $U_{CON}$ 136 relative to detected switching events of power switch 122 during a transition operation. In these examples, secondary controller 120 may monitor a voltage developed on the secondary side (e.g., at node 147 of secondary winding 116) to determine when power switch 122 switches states. After primary controller 118 receives the one or more control signals $U_{CON}$ 136 that are timed relative to switching events of power switch 122, primary controller 118 may cease switching according to the primary switching pattern and wait for subsequent control signals $U_{CON}$ 136. Primary controller 118 may then set power switch 122 into the ON state in response to each of the subsequent control signals $U_{CON}$ 136. An example implementation in which secondary controller 120 schedules the transmission of one or more control signals $U_{CON}$ 136 with respect to switching events of power switch 122 is illustrated and described with respect to FIGS. 7A-7B. Although secondary controller 120 may schedule the transmission of control signals $U_{CON}$ 136 relative to switching events of power switch 122 in some implementations, as described above, in other implementations, secondary controller 120 may not schedule the transmission of control signals $U_{CON}$ 136 relative to switching events of power switch 122.

In some examples, primary controller 118 may acknowledge receipt of control signals $U_{CON}$ 136 transmitted by secondary controller 120 during the transition operation. For example, primary controller 118 may acknowledge receipt of control signals $U_{CON}$ 136 during the transition operation by adjusting the switching pattern of power switch 122 to be different than the primary switching pattern of the first mode. In one example, as illustrated in FIGS. 7A-7B, primary controller 118 acknowledges receipt of control signals $U_{CON}$ 136 by ceasing switching of power switch 122 for a period of time (i.e., a "quiet period") in response to receiving one or more control signals $U_{CON}$ 136 from secondary controller 120. In other examples, primary controller 118 may acknowledge receipt of the one or more control signals $U_{CON}$ 136 during the transition operation by increasing or decreasing the rate at which power switch 122 is switched relative to the rate at which power switch 122 was switched according to the primary switching pattern.

In examples where primary controller 118 acknowledges receipt of control signals $U_{CON}$ 136 during the transition operation, primary controller 118 may cease switching power switch 122 according to the primary switching pattern after acknowledging receipt of control signals $U_{CON}$ 136. Primary controller 118 may then wait for subsequent control signals $U_{CON}$ 136. After secondary controller 120 detects acknowledgement (e.g., the quiet period or the modified switching pattern) by primary controller 118, secondary controller 120 may begin transmitting control signals $U_{CON}$ 136 to primary controller 118 when output voltage $V_{OUT}$ 108 is less than the desired output voltage value. Primary controller 118 may then switch power switch 122 into the ON state in response to each of the control signals $U_{CON}$ 136.

Although primary controller 118 may acknowledge receipt of the one or more control signals by modifying the switching pattern of power switch 122, in some examples, primary controller 118 may acknowledge receipt of the one or more control signals $U_{CON}$ 136 in other ways. For example, if the communication link between primary and secondary controllers 118, 120 allows for transmission of signals from primary controller 118 to secondary controller 120, primary controller 118 may acknowledge receipt of the one or more control signals $U_{CON}$ 136 by transmitting an acknowledgement signal 149 back to secondary controller 120 via the communication link. In this example, primary controller 118 may cease switching power switch 122 upon sending acknowledgement signal 149 to secondary controller 120 and wait for subsequent control signals $U_{CON}$ 136. Secondary controller 120 may begin generating control signals $U_{CON}$ 136 to control when power switch 122 is set into the ON state after secondary controller 120 receives acknowledgment signal 149 from primary controller 118 via the communication link. Primary controller 118 may set power switch 122 into the ON state in response to the subsequently received control signals $U_{CON}$ 136.

Power converter 100 may be operating in the second mode after a transition operation from the first mode is completed. In the second mode, secondary controller 120 may transmit control signals $U_{CON}$ 136 to primary controller 118 to control when power switch 122 is set into the ON state. For example, secondary controller 120 may transmit control signals $U_{CON}$ 136 when output voltage $V_{OUT}$ 108 is less than the desired output voltage value. In response to each of the control signals $U_{CON}$ 136, primary controller 118 may set power switch 122 into the ON state and subsequently set power switch 122 into the OFF state in response to detection of a turn-off condition. In the second mode, secondary controller 120 may refrain from transmitting control signals $U_{CON}$ 136 when output voltage $V_{OUT}$ 108 is greater than the desired output voltage value.

During normal operation, power converter 100 may remain in the second mode after transitioning from the first mode to the second mode after startup. However, in some circumstances, power converter 100 may transition from the second mode back to the first mode. Circumstances in which power converter 100 transitions from the second mode back to the first mode are described hereinafter.

In some examples, primary controller 118 may take control of power switch 122 from secondary controller 120 when primary controller 118 detects that secondary controller 120 is experiencing potential abnormal operating conditions. Primary controller 118 may determine that secondary controller 120 is experiencing potential abnormal operating conditions based on a number of control signals $U_{CON}$ 136 received over a period of time. In one example, primary controller 118 may determine that secondary controller 120 is experiencing potential abnormal operating conditions when primary controller 118 does not receive a control signal $U_{CON}$ 136 for a period of time. In another example, primary controller 118 may determine that secondary controller 120 is experiencing potential abnormal operating conditions when primary controller 118 is receiving an excessive number (e.g., greater than a threshold number) of control signals $U_{CON}$ 136 over a period of time.

In some examples, when primary controller 118 fails to receive a control signal $U_{CON}$ 136 for a threshold amount of time, primary controller 118 may take control of power switch 122 and begin controlling power switch 122 according to the primary switching pattern. Controlling power switch 122 according to the primary switching pattern may transfer energy to the secondary side and prevent output voltage $V_{OUT}$ 108 from dropping below the desired output voltage value. In other examples, primary controller 118 may maintain power switch 122 in the OFF state in order to cause secondary controller 120 to power down. Then primary controller 118 may control power switch 122 according to the primary switching pattern to cause secondary controller 120 to begin operating again. After secondary controller 120 enters an operational state, secondary controller 120 may initiate a transition operation to regain control of power switch 122.

In circumstances where primary controller 118 receives an excessive number (e.g., greater than a threshold number) of control signals $U_{CON}$ 136 within a period of time, primary controller 118 may ignore subsequent control signals $U_{CON}$ 136 and maintain power switch 122 in the OFF state. Maintaining power switch 122 in the OFF state for a sufficient amount of time may cause secondary controller 120 to lose operating power. In these examples, primary controller 118 may return to switching power switch 118 (e.g., according to the primary switching pattern) after a period of time has elapsed that is sufficient to cause secondary controller 120 to power down. Secondary controller 120 may then begin operating once bypass capacitor 130 has been recharged to a sufficient level. After secondary controller 120 begins operating, secondary controller 120 may perform a transition operation in order to take control of power switch 122, as described above. If secondary controller 120 begins sending excessive control signals $U_{CON}$ 136 after powering back up, primary controller 118 may again take control of power switch 122. This process may be repeated until power converter 100 is disconnected from the power source and primary controller 118 powers down.

An excessive number of control signals $U_{CON}$ 136 over a period of time may indicate a short circuit on the secondary side of power converter 100. An excessive number of control signals $U_{CON}$ 136 over a period of time may also cause primary controller 118 to transfer an excessive amount of energy to the secondary side. By ignoring the excessive number of control signals $U_{CON}$ 136, primary controller 118 may prevent transferring an excessive amount of energy to the secondary side.

Accordingly, primary controller 118 may be coupled to transition from the second mode to the first mode when primary controller 118 detects an excessive number of control signals $U_{CON}$ 136 over a period of time and/or an absence of control signals $U_{CON}$ 136 within a threshold amount of time. In examples where primary controller 118 transitions from the first mode to the second mode, secondary controller 120 may detect the transition of primary controller 118 from the first mode to the second mode. For example, secondary controller 120 may detect changes in the switching pattern of power switch 122 when primary controller 118 transitions from the first mode to the second mode. In examples where primary controller 118 stops switching power switch 122 in response to receiving an excessive number of control signals $U_{CON}$ 136 over a period of time, secondary controller 120 may detect that primary controller 118 has transitioned to the first mode upon detecting that power switch 122 has stopped switching in response to transmitted control signals $U_{CON}$ 136. In examples where primary controller 118 begins switching power switch 122 after failing to receive a control signal $U_{CON}$ 136 for a threshold amount of time, secondary controller 120 may detect that primary controller 118 has transitioned to the first mode upon detecting the switching according to the primary switching pattern.

In some examples, secondary controller 120 may be coupled to acknowledge the transition of primary controller 118 from the second mode to the first mode. For example, secondary controller 120 may be coupled to acknowledge the transition of primary controller 118 by modifying the transmission of control signals $U_{CON}$ 136 to primary controller 118. In an example where secondary controller 120 is sending an excessive number of control signals $U_{CON}$ 136 over a period of time, secondary controller 120 may acknowledge the transition of primary controller 118 from the second mode to the first mode by ceasing the transmission of control signals $U_{CON}$ 136 upon detecting the transition of primary controller 118 to the first mode. In an example where primary controller 118 detects an absence of control signals $U_{CON}$ 136 within a threshold amount of time, secondary controller 120 may acknowledge the transition of primary controller 118 to the first mode by initiating a subsequent transition operation.

Operation of example circuits included in primary controller 118 and secondary controller 120 is now described in greater detail with respect to FIG. 2. FIG. 2 shows an example integrated circuit package 224 that includes a power switch 222 (e.g., power MOSFET 222), an example primary controller 218, and an example secondary controller 220. Circuits external to integrated circuit package 224 may electrically couple to package terminals D 226-1, S 226-2, PBP 226-3, FWD 226-4, BP 226-5, GND 226-6, and FB 226-7 (collectively "package terminals 226") of integrated circuit package 224.

Package terminals 226 may connect to terminals D 228-1, S 228-2, PBP 228-3, FWD 228-4, BP 228-5, GND 228-6, and FB 228-7 of power switch 222, primary controller 218, and secondary controller 220 included on the inside of integrated circuit package 224. Package terminals 226 may be connected to a power converter in a similar manner as illustrated in FIG. 1. Accordingly, the description of integrated circuit package 224 may hereinafter reference the components of power converter 100 of FIG. 1.

Primary controller 218 includes a primary switch control circuit 250 that generates switch drive signal $U_{DRIVE}$ 238 to set the state of power switch 222. Primary controller 218 also includes a current sense circuit 252, a primary switching pattern circuit 254, and a signal monitoring circuit 256. Secondary controller 220 includes a secondary switch control circuit 258, a charging circuit 260, and a voltage detection circuit 262. Ground terminal GND 228-6 may be the output return for circuits of secondary controller 220.

Primary controller 218 may include additional circuits that are not illustrated in FIG. 2. For example, primary controller 218 may include circuits that couple to terminal PBP 228-3 to provide power to primary controller 218. Secondary controller 220 may also include additional circuits and/or terminals not illustrated in FIGS. 1-2. For example, secondary controller 220 may include an additional terminal that is coupled to output terminal 104-1. The additional terminal may be coupled to charging circuit 260 to charge bypass capacitor 130 from output terminal 104-1. For example, charging circuit 260 may charge bypass capacitor 130 from forward terminal FWD 228-4 and/or the additional terminal coupled to output terminal 104-1. Charging bypass capacitor 130 from output terminal 104-1 during operation may be more efficient than charging bypass capacitor 130 from forward terminal FWD 228-4.

Current sense circuit 252 may sense an amount of switch current $I_{SWITCH}$ 264 through power switch 222 when power switch 222 is in the ON state. Primary switch control circuit 250 may determine when the amount of current through power switch 222 has reached a threshold current limit based on the amount of current sensed by current sense circuit 252. In some examples, primary switch control circuit 250 may set power switch 222 into the OFF state in the first and/or second modes when the amount of current sensed by current sense circuit 252 reaches the threshold current limit.

Primary switching pattern circuit 254 represents circuits that define the primary switching pattern. The primary switching pattern may define a switching frequency, a power switch ON time, a duty cycle, or other switching parameters. The primary switching pattern may include fixed values in some examples. In other examples, primary switch control circuit 250 may modify the primary switching pattern during operation. In some examples, the power switch ON time may be approximately five microseconds, the maximum duty cycle may be approximately 65%, and the frequency may be approximately 132 kHz.

Operation of primary controller 218 and secondary controller 220 in the first and second modes is now described. In the first mode, primary switch control circuit 250 controls the state of power switch 222 according to the primary switching pattern. In other words, primary switch control circuit 250 generates switch drive signal $U_{DRIVE}$ 238 according to the primary switching pattern/the first mode. In some examples, primary switch control circuit 250 may control the state of power switch 222 during the first mode according to the primary switching pattern and an amount of current sensed by current sense circuit 252. For example, the primary switching pattern may define when to set power switch 222 into the ON state and primary switch control circuit 250 may set power switch 222 into the OFF state in response to the amount of switch current $I_{SWITCH}$ 264 through power switch 222.

While primary controller 218 controls the state of power switch 222 in the first mode, secondary controller 220 may be in a powered down state. Secondary controller 220 may be in a powered down state during the first mode (e.g., during startup or after loss of power) because secondary controller 220 may not be receiving sufficient operating power from bypass capacitor 130. For example, in the first mode, secondary switch control circuit 258 may not have sufficient operating power transmit control signals $U_{CON}$ 236 to primary switch control circuit 250. Accordingly, primary switch control circuit 250 may control the state of power switch 222 without receiving control signals $U_{CON}$ 236 from secondary switch control circuit 258 in the first mode.

During the first mode, energy is transferred to the secondary side of power converter 100 while primary switch control circuit 250 controls power switch 222 according to the primary switching pattern. Charging circuit 260 may be coupled to charge bypass capacitor 130 using forward terminal FWD 228-4 while primary switch control circuit 250 switches power switch 222. Accordingly, during the first mode, charging circuit 260 may operate to charge bypass capacitor 130 towards a voltage that is sufficient to operate the circuits of secondary controller 220 (e.g., voltage detection circuit 262 and/or secondary switch control circuit 258). After a period of time during the first mode, bypass voltage $V_{BP}$ 134 reaches a voltage that is sufficient to operate the circuits of secondary controller 220.

Charging circuit 260 may regulate bypass voltage $V_{BP}$ 134 at a voltage that is sufficient to operate the circuits of secondary controller 220. In some examples, secondary controller 220 may include an additional terminal that is coupled to output terminal 104-1. In these examples, charging circuit 260 may be coupled to regulate bypass voltage $V_{BP}$ 134 using forward terminal FWD 228-4 and/or the additional terminal coupled to output terminal 104-1.

After secondary controller 220 begins operating, secondary switch control circuit 258 may decide to take control of power switch 222 from primary switch control circuit 250. Voltage detection circuit 262 may sense parameters on the secondary side to determine whether power converter 100 is operating in a manner that allows secondary switch control circuit 258 to reliably perform a transition operation. In some examples, voltage detection circuit 262 may indicate to secondary switch control circuit 258 when to initiate a transition operation based on at least one of the bypass voltage $V_{BP}$ 134 and/or the output voltage $V_{OUT}$ 108. For example, voltage detection circuit 262 may indicate to secondary switch control circuit 258 to initiate a transition operation when bypass voltage $V_{BP}$ 134 is greater than a threshold bypass voltage. As another example, voltage detection circuit 262 may indicate to secondary switch control circuit 258 to initiate a transition operation when output voltage $V_{OUT}$ 108 is greater than a threshold output voltage. In other examples, voltage detection circuit 262 may indicate to secondary switch control circuit 258 to initiate a transition operation when both bypass voltage $V_{BP}$ 134 is greater than a threshold bypass voltage and when output voltage $V_{OUT}$ 108 is greater than a threshold output voltage.

Secondary switch control circuit 258 may initiate a transition operation when voltage detection circuit 262 indicates to secondary switch control circuit 258 that the transition operation may be reliably performed. Primary switch control circuit 250 and secondary switch control circuit 258 may implement a transition operation for primary and secondary controllers 218, 220 as described above. An example transition operation that may be implemented by primary switch control circuit 250 and secondary switch control circuit 258 is illustrated and described hereinafter with reference to FIGS. 7A-7B.

After secondary switch control circuit 258 and primary switch control circuit 250 implement a transition operation, primary controller 218 and secondary controller 220 may be operating in the second mode. During the second mode, primary switch control circuit 250 may cease switching of power switch 222 according to the primary switching pattern. Instead, primary switch control circuit 250 sets power switch 222 into the ON state in response to control signals $U_{CON}$ 236 transmitted by secondary switch control circuit 258. For example, in the second mode, secondary switch control circuit 258 transmits control signals $U_{CON}$ 236 to primary switch control circuit 250 that cause primary switch control circuit 250 to set power switch 222 into the ON state in response to each of control signals $U_{CON}$ 236. Accordingly, during the second mode, secondary switch control circuit 258 may control when power switch 222 is set into the ON state by primary switch control circuit 250.

After primary switch control circuit 250 switches power switch 222 into the ON state in response to a control signal $U_{CON}$ 236, primary switch control circuit 250 may switch power switch 222 back into the OFF state in response to a detected turn-off condition. In some examples, a turn-off condition may include a threshold amount of switch current $I_{SWITCH}$ 264 and/or a threshold ON time of power switch 222. Primary switch control circuit 250 may then maintain power switch 222 in the OFF state until primary switch control circuit 250 receives another control signal $U_{CON}$ 236.

Secondary switch control circuit 258 receives feedback voltage $V_{FB}$ 132 that is representative of output voltage $V_{OUT}$ 108. During the second mode, secondary switch control circuit 258 may transmit a control signal $U_{CON}$ 236 when secondary switch control circuit 258 determines that output voltage $V_{OUT}$ 108 of power converter 100 is less than the desired output voltage value. Secondary switch control circuit 258 may refrain from transmitting control signals $U_{CON}$ 236 when output voltage $V_{OUT}$ 108 is greater than the desired output voltage value.

As described above, primary controller 218 may take control of power switch 222 from secondary controller 220 when primary controller 218 detects that secondary controller 220 is experiencing potential abnormal operating conditions. Potential abnormal operating conditions may be indicated by the number of control signals $U_{CON}$ 236 received by primary controller 218. Primary controller 218 includes a signal monitoring circuit 256 that monitors the number of control signals $U_{CON}$ 236.

Signal monitoring circuit 256 may detect potential abnormal operating conditions based on the number of control signals $U_{CON}$ 236 received during a period of time. Signal monitoring circuit 256 may indicate to primary switch control circuit 250 when potential abnormal operating conditions are detected. In one example, signal monitoring circuit 256 may determine that secondary controller 220 is experiencing potential abnormal operating conditions when signal monitoring circuit 256 does not receive a control signal $U_{CON}$ 236 for a period of time. In another example, signal monitoring circuit 256 may determine that secondary controller 220 is experiencing potential abnormal operating conditions when signal monitoring circuit 256 is receiving an excessive number (e.g., greater than a threshold number) of control signals $U_{CON}$ 236 over a period of time.

Operation of primary and secondary controllers 218, 220 during and after startup of power converter 100 is described hereinafter with respect to FIGS. 3-7B. FIG. 6 illustrates scenarios in which primary controller 218 may take back control of power switch 222. FIGS. 7A-7B illustrate an example transition operation.

Figure 3:
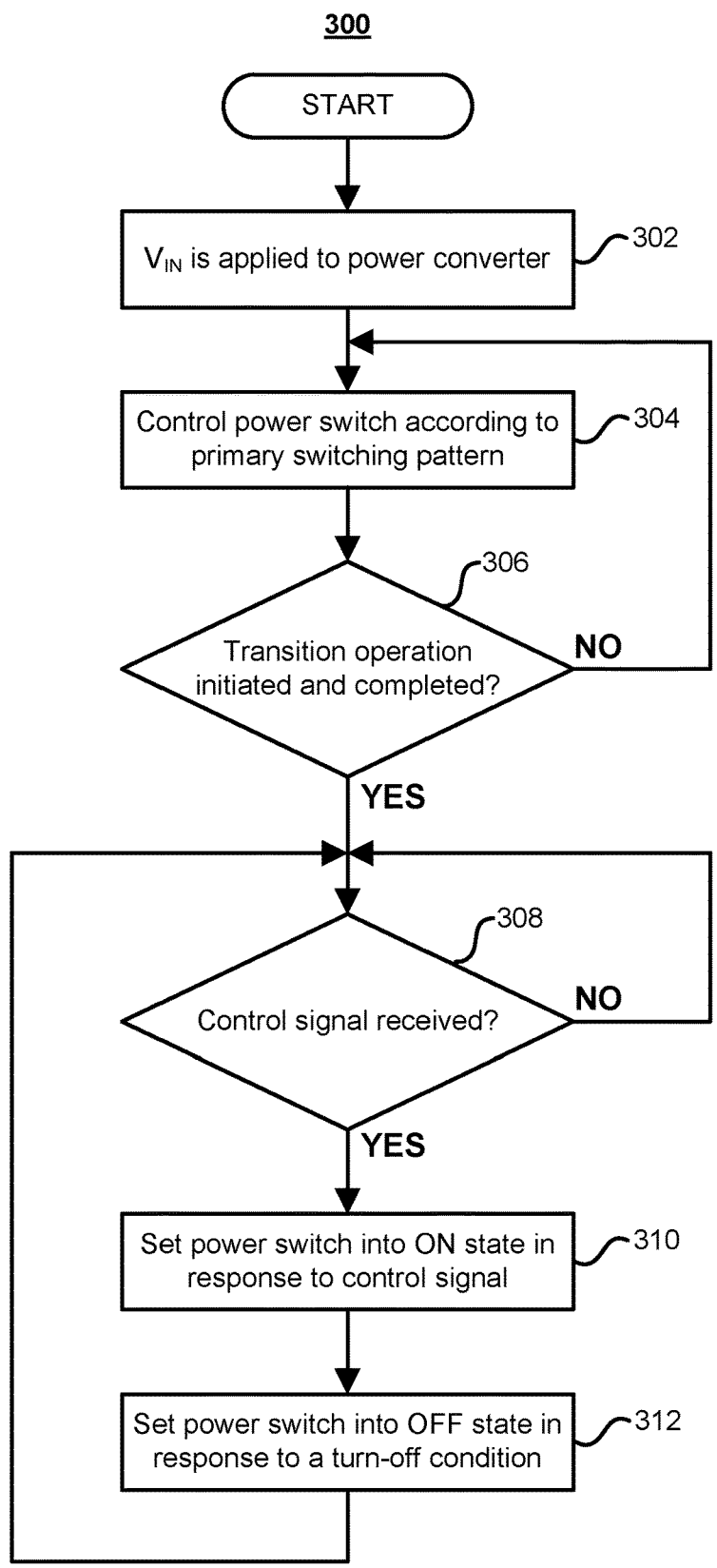
FIG. 3 is a flow diagram that describes operation of an example primary controller.

FIG. 3 is a flow diagram describing operation of primary controller 218 from startup until primary controller 218 is operating in the second mode. Before the start of method 300, it may be assumed that bypass capacitor 130 is discharged to a voltage level that is insufficient for operating secondary controller 220. In block 302, input voltage $V_{IN}$ 106 is introduced to power converter 100. In block 304, primary switch control circuit 250 controls power switch 222 according to the primary switching pattern.

While primary switch control circuit 218 is controlling power switch 222 in block 304, secondary controller 220 may initiate a transition operation after secondary controller 220 transitions from a powered down state to an operational state. In block 306, primary switch control circuit 250 determines whether a transition operation has been initiated and whether the transition operation is completed. As described above, a transition operation may include receipt of one or more control signals $U_{CON}$ 236 by primary switch control circuit 250 in some examples. In some examples, primary switch control circuit 250 may determine whether the received control signals $U_{CON}$ 236 are received relative to a switching event in order to determine whether the transition operation is completed. In some examples described above, primary switch control circuit 250 may generate an acknowledgment (e.g., a modified switching pattern) during the transition operation.

After primary switch control circuit 250 determines that the transition operation is complete in block 306, primary switch control circuit 250 may operate in the second mode. In the second mode, primary switch control circuit 250 may wait to receive a control signal $U_{CON}$ 236 in block 308. Primary switch control circuit 250 sets power switch 222 into the ON state in response to a received control signal $U_{CON}$ 236 in block 310. Primary switch control circuit 250 sets power switch 222 into the OFF state in response to detection of a turn-off condition in block 312. Primary switch control circuit 250 may then wait for another control signal $U_{CON}$ 236 in block 308.

Figure 4:
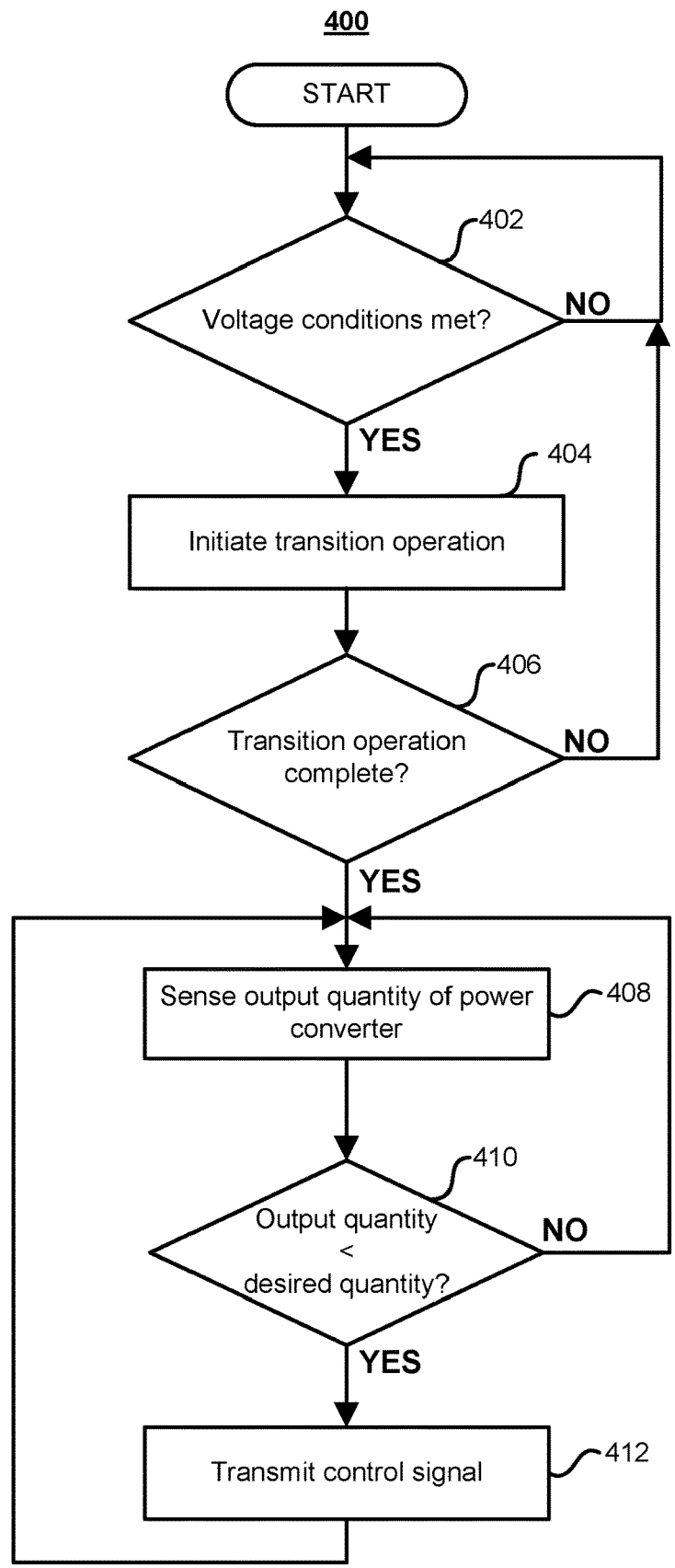
FIG. 4 is a flow diagram that describes operation of an example secondary controller.

FIG. 4 is a flow diagram describing operation of secondary controller 220 from startup until secondary controller 220 is operating in the second mode. Before the start of method 400, it may be assumed that bypass capacitor 130 is discharged to a voltage level that is insufficient for operating secondary controller 220. In block 402, voltage detection circuit 262 senses voltages (e.g., bypass voltage $V_{BP}$ 134 and/or output voltage $V_{OUT}$ 108) on the secondary side and determines whether the sensed voltages are sufficient for initiating a transition operation. If the sensed voltages are not sufficient for initiating a transition operation, voltage detection circuit 262 continues sensing the voltages in block 402.

If the sensed voltages are sufficient for initiating a transition operation, voltage detection circuit 262 indicates to secondary switch control circuit 258 to initiate a transition operation. In block 404, secondary switch control circuit 258 initiates a transition operation. In block 406, secondary switch control circuit 258 determines whether the transition operation is completed. In some examples, secondary switch control circuit 258 may initiate and complete the transition operation by transmitting one or more control signals $U_{CON}$ 236 without receiving an acknowledgement. In other examples, secondary switch control circuit 258 may determine that the transition operation is completed when secondary switch control circuit 258 detects an acknowledgement. In some examples, secondary switch control circuit 258 may detect an acknowledgement by detecting a modification of the switching pattern of power switch 222. In these examples, secondary switch control circuit 258 may monitor a voltage on the secondary side that indicates switching of power switch 222, such as a voltage at node 147 of secondary winding 116.

If the transition operation fails, secondary controller 220 may continue operation in block 402. If the transition operation is successful, secondary controller 220 is operating in the second mode in block 408. In block 408, secondary switch control circuit 258 senses an output quantity of power converter 100 (e.g., output voltage $V_{OUT}$ 108). In block 408, secondary switch control circuit 258 determines whether the sensed output quantity (e.g., output voltage $V_{OUT}$ 108) is less than a desired output quantity (e.g., the desired output voltage value). If the sensed output quantity is less than the desired output quantity in block 410, secondary switch control circuit 258 transmits a control signal $U_{CON}$ 236 in block 412 and returns to sensing the output quantity of power converter 100 in block 408. If the sensed output quantity is not less than the desired output quantity in block 410, secondary switch control circuit 258 returns to sensing the output quantity in block 408.

Figure 5:
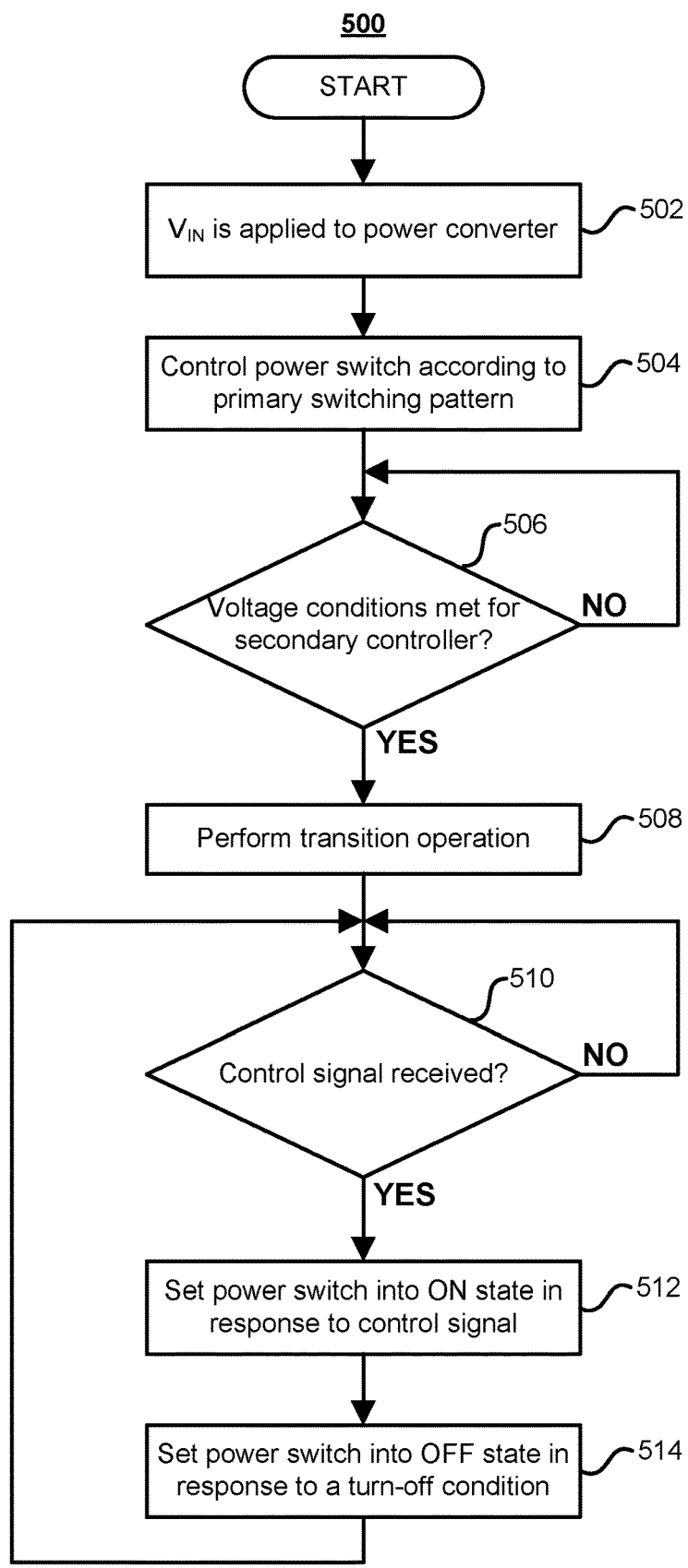
FIG. 5 is a flow diagram that describes operation of a primary controller and a secondary controller.

FIG. 5 is a flow diagram describing operation of primary controller 218 and secondary controller 220 from startup until primary controller 218 and secondary controller 220 are operating in the second mode. Before the start of method 500, it may be assumed that bypass capacitor 130 is discharged to a voltage level that is insufficient for operating secondary controller 220. In block 502, input voltage $V_{IN}$ 106 is applied to power converter 100. In block 504, primary switch control circuit 250 controls power switch 222 according to the primary switching pattern.

While primary switch control circuit 250 is controlling power switch 222 in block 504, voltage detection circuit 262 senses voltages (e.g., bypass voltage $V_{BP}$ 134 and/or output voltage $V_{OUT}$ 108) on the secondary side and determines whether the sensed voltages are sufficient for initiating a transition operation. If the sensed voltages are not sufficient for initiating a transition operation, voltage detection circuit 262 continues sensing the voltages in block 506.

If the sensed voltages are sufficient for initiating a transition operation, voltage detection circuit 262 indicates to secondary switch control circuit 258 to initiate a transition operation. In block 508, primary controller 218 and secondary controller 220 perform a transition operation. Primary controller 218 and secondary controller 220 are operating in the second mode after performing the transition operation in block 508.

In the second mode, secondary switch control circuit 258 senses an output quantity of power converter 100 and transmits a control signal $U_{CON}$ 236 to primary switch control circuit 250 when the sensed output quantity is less than the desired output quantity. In the second mode, primary switch control circuit 250 may wait to receive a control signal $U_{CON}$ 236 in block 510. Primary switch control circuit 250 sets power switch 222 into the ON state in response to a received control signal $U_{CON}$ 236 in block 512. Primary switch control circuit 250 sets power switch 222 into the OFF state in response to detection of a turn-off condition in block 514. Primary switch control circuit 250 may then wait for another control signal $U_{CON}$ 236 in block 510.

FIG. 6 is a flow diagram that describes operation of primary controller 218 in the second mode. Specifically, FIG. 6 is a method 600 that illustrates detection of potential abnormal operating conditions by primary controller 218. At the start of the method 600, it may be assumed that primary controller 218 is operating in the second mode. Accordingly, in block 602, primary switch control circuit 250 receives a control signal $U_{CON}$ 236, sets power switch 222 into the ON state in response to the control signal $U_{CON}$ 236, and sets power switch 222 into the OFF state in response to a turn-off condition.

In block 604, signal monitoring circuit 256 determines whether a control signal $U_{CON}$ 236 is received. If a control signal $U_{CON}$ 236 has not been received in block 604, in block 606 signal monitoring circuit 256 determines whether a first period of time (e.g., a threshold period of time) has passed since the last control signal was received. The first period of time may be approximately one second in some examples. If the first period of time has passed since receipt of a control signal, signal monitoring circuit 256 may indicate to primary switch control circuit 250 that the first period of time has passed since the last received control signal. In response to the indication from signal monitoring circuit 256, primary switch control circuit 250 may start switching power switch 222 (e.g., according to the primary switching pattern) in block 607 for a second period of time in order to maintain the output voltage $V_{OUT}$ 108 at a sufficient level to operate secondary controller 220. In the event that the absence of control signals detected in block 606 was due to a powering down of secondary controller 220, switching of power switch 222 in block 607 may power up secondary controller 220 and allow secondary controller 220 to initiate a transition operation. In the event that a transition operation is initiated and completed due to switching of power switch 222 in block 607, the method 600 may be restarted to continue in block 602. The method 600 may continue in block 612 in the event that a transition operation is not initiated due to switching of power switch 222 in block 607.

Primary switch control circuit 250 may refrain from switching power switch 222 for a third period of time in block 612. Secondary controller 220 may power down during the third period of time in which primary switch control circuit 250 refrains from switching power switch 222. Primary switch control circuit 250 may then start switching power switch 222 according to the primary switching pattern in block 614 so that secondary controller 220 is powered on. After secondary controller 220 is powered on, secondary controller 220 may initiate a transition operation to take back control of power switch 222.

If a control signal $U_{CON}$ 236 is received in block 604, primary switch control circuit 250 may set power switch 222 into the ON state in response to control signal $U_{CON}$ 236 and then set power switch 222 into the OFF state in response to a detected turn-off condition in block 608. In block 610, signal monitoring circuit 256 determines whether an excessive number of control signals $U_{CON}$ 236 have been received over a period of time. For example, signal monitoring circuit 256 may determine that an excessive number of control signals $U_{CON}$ 236 have been received if greater than a threshold number of control signals $U_{CON}$ 236 have been received over a period of time. As another example, signal monitoring circuit 256 may determine that an excessive number of control signals $U_{CON}$ 236 have been received if control signals $U_{CON}$ 236 have been received at a near maximum rate for a period of time. In one implementation, an excessive number of control signals may be approximately eight thousand control signals (e.g., $2^{13}$ control signals) within a 64 millisecond period of time.

If signal monitoring circuit 256 determines that an excessive number of control signals $U_{CON}$ 236 have been received in block 610, primary switch control circuit 250 may refrain from switching power switch 222 for a period of time in block 612, even if additional control signals $U_{CON}$ 236 are received. Secondary controller 220 may power down during the period of time in which primary switch control circuit 250 refrains from switching power switch 222. After the period of time has elapsed, primary switch control circuit 250 begins controlling power switch 222 according to the primary switching pattern in block 614. At the end of method 600, primary controller 218 and secondary controller 220 are operating in the first mode.

FIG. 7A illustrates operation of primary and secondary controllers 218, 220 during the first mode, a transition operation, and the second mode. FIG. 7B shows a magnified view of control signals sent during the transition operation that are timed relative to switching events of power switch 222. It may be assumed that input voltage $V_{IN}$ 106 has been applied at or before time zero.

The transition operation of FIG. 7 may include the following operations. Secondary controller 220 transmits multiple (e.g., 2) control signals $U_{CON}$ 765, 766 during the transition operation illustrated in FIGS. 7A-7B. The multiple control signals $U_{CON}$ 765, 766 are each scheduled relative to a switching event (e.g., a turn OFF event) of power switch 222. Additionally, primary controller 218 acknowledges the receipt of the control signals $U_{CON}$ 765, 766 by changing the switching pattern of power switch 222. Specifically, primary controller 218 refrains from switching power switch 222 for a "quiet period" to acknowledge receipt of the control signals $U_{CON}$ 765, 766.

Referring now to FIG. 7A, at time zero, primary and secondary controllers 218, 220 are operating in the first mode. Accordingly, primary controller 218 is controlling power switch 222 according to the primary switching pattern. The switch current $I_{SWITCH}$ 264 waveform illustrates when power switch 222 is set into the ON state (e.g., at 767) and when power switch 222 is set into the OFF state (e.g., at 768).

Secondary controller 220 initiates the transition operation by transmitting control signal $U_{CON}$ 765. Specifically, secondary controller 220 transmits control signal $U_{CON}$ 765 during a window of time (i.e., a "receive window") after power switch 222 is set into the OFF state at 769. In the example illustrated in FIGS. 7A-7B, primary controller 218 may be configured to identify a control signal as the start of a transition operation if received during receive window 770. Since control signal $U_{CON}$ 765 is received during receive window 770, the transition operation begins at 771.

Secondary controller 220 transmits a second control signal $U_{CON}$ 766 in response to detecting power switch 222 switching into the OFF state at 772. Specifically, secondary controller 220 detects power switch 222 switching into the OFF state and transmits control signal 766 within receive window 773. Primary controller 218 detects control signal 766 within receive window 773. Primary controller 218 acknowledges receipt of the two consecutive control signals $U_{CON}$ 765, 766 received within receive windows 770, 773 and begins operating in the second mode. As illustrated in FIG. 7A, primary controller 218 acknowledges receipt of control signals $U_{CON}$ 765, 766 by refraining from switching power switch 222 for a duration of time referred to as a "quiet period" in FIG. 7A.

Secondary controller 220 detects the modified switching pattern (i.e., the quiet period) generated by primary controller 218 and identifies the modified switching pattern as an acknowledgement. Specifically, secondary controller 220 detects the absence of switching events after transmitting control signal 766 and identifies this quiet period as an acknowledgement. Secondary controller 220 then transitions to the second mode. During the second mode, secondary controller 220 generates control signals $U_{CON}$ 774, 775 when output voltage $V_{OUT}$ 108 drops below the desired output voltage value. Primary controller 218 sets power switch 222 into the ON state at 776 and 777 in response to receipt of control signals $U_{CON}$ 774, 775. Primary controller 218 may set power switch 222 into the OFF state at 778 and 779 in response to detection of a turn-off condition.

FIG. 7B graphically illustrates receive windows 770, 773. Receive windows 770, 773 may be windows of time that are set to occur a period of time after power switch 222 is set into the OFF state. The period of time from when power switch 222 is set into the OFF state until the start of the receive windows 770, 773 may be referred to as "blanking periods 780, 781." Blanking periods 780, 781 may be periods of time during which primary controller 218 is configured to ignore control signals transmitted from secondary controller 220. Blanking periods 780, 781 may be implemented by primary controller 218 in order to prevent the interpretation of switching noise as valid control signals. In scenarios where the switching of power switch 222 may induce noise in primary controller 218 and/or the communication link, such noise may arise within blanking periods 780, 781, and may therefore be ignored by primary controller 218. In some examples, the quiet period of FIG. 7A may be approximately 10 microseconds in duration. Receive windows 770, 773 may each be approximately 2 microseconds in duration in some examples. Blanking periods 780, 781 may be approximately 0.7 microseconds in duration in some examples. Although example durations of the quiet period, receive windows 770, 773, and blanking periods 780, 781 are described and illustrated with respect to FIGS. 7A-7B, it is contemplated that other durations may be implemented in other examples.

FIGS. 8A-8B show example communication links through which control signal $U_{CON}$ 236 may be transmitted. The communication links illustrated in FIGS. 8A-8B may be included in integrated circuit package 224. FIG. 8A shows an example magnetically coupled communication link included in integrated circuit package 224. Integrated circuit package 224 includes a primary conductive loop 882 and a secondary conductive loop 883 that are galvanically isolated from one another. In some examples, primary conductive loop 882 and secondary conductive loop 883 may be isolated conductors of the lead frame of integrated circuit package 224.

Primary conductive loop 882 may be coupled to primary switch control circuit 250. Secondary conductive loop 883 may be coupled to secondary switch control circuit 258. Although primary and secondary conductive loops 882, 883 are galvanically isolated from one another, primary and secondary conductive loops 882, 883 may be magnetically coupled such that a change in current through secondary conductive loop 883 may induce a change in voltage/current in primary conductive loop 882. Secondary switch control circuit 258 may transmit control signal $U_{CON}$ 236 to primary switch control circuit 250 by inducing a change in current through secondary conductive loop 883. Primary switch control circuit 250 may detect control signal $U_{CON}$ 236 by detecting an induced voltage and/or current in primary conductive loop 882. In some examples, primary controller 218 may acknowledge receipt of one or more control signals $U_{CON}$ 236 by transmitting an acknowledgement signal 149 back to secondary controller 220 via the communication link.

FIG. 8B shows an example optically coupled communication link included in integrated circuit package 224. Integrated circuit package 224 includes an optical transmitter 884 (e.g., a light-emitting diode) and an optical receiver 885 (e.g., a phototransistor) that are galvanically isolated from one another. Optical receiver 885 may be coupled to primary switch control circuit 250. Optical transmitter 884 may be coupled to secondary switch control circuit 258. Optical transmitter 884 may emit light that is detected by optical receiver 885. Secondary switch control circuit 258 may transmit control signal $U_{CON}$ 236 to primary switch control circuit 250 by energizing optical transmitter 884 to emit light. Primary switch control circuit 250 may detect control signal $U_{CON}$ 236 by detecting an induced voltage and/or current generated by optical receiver 885 in response to the light emitted by optical transmitter 884. It is contemplated that communication link technologies other than magnetically and optically coupled communication links may be used. For example, a capacitive coupling may be used as a communication link between primary controller 218 and secondary controller 220.

FIG. 9 shows an example non-isolated power converter 985 that includes a primary controller 986 and a secondary controller 987 of the present disclosure. Although primary controller 986 and secondary controller 987 are illustrated as included in a non-isolated power converter 985 having a buck converter topology, it is contemplated that primary controller 986 and secondary controller 987 may be included in non-isolated power converters having other topologies. Primary controller 986 and secondary controller 987 may operate in a similar manner as primary controller 218 and secondary controller 220 described above.

Power converter 985 includes input terminals 988-1, 988-2 (collectively "input terminals 988") and output terminals 989-1, 989-2 (collectively "output terminals 989"). Input terminals 988 are coupled to receive an input voltage $V_{IN}$ 990, which may be a rectified and filtered ac voltage. Output terminals 989 provide an output voltage $V_{OUT}$ 991 to a load (not shown).

Power converter 985 includes input capacitor 992, output capacitor 993, inductor 994, diode 995, and power switch 996. As illustrated in FIG. 9, power switch 996, diode 995, and inductor 994 are coupled to operate as a buck converter circuit. Secondary controller 987 may be coupled to receive operating power from node 997 and/or bypass capacitor 998. Secondary controller 987 may also be coupled to output terminals 989 via a feedback circuit 999 that allows secondary controller 987 to sense an output quantity of power converter 985 (e.g., output voltage $V_{OUT}$ 991).

Primary controller 986 and secondary controller 987 are galvanically isolated from one another. Even though the output of power converter 985 shown in the example in FIG. 9 is not isolated from the input, the galvanic isolation between primary controller 986 and secondary controller 987 allows for power switch 996 to float with respect to the output ground, which may eliminate the need for a complex level shift circuit. Secondary controller 987 may transmit a control signal $U_{CON}$ 1000 to primary controller 986 via a communication link (e.g., a magnetically, capacitively, or optically coupled communication link). Primary controller 986 may control the state of power switch 996 by generating switch drive signal $U_{DRIVE}$ 1001.

Primary controller 986 and secondary controller 987 may operate to regulate an output quantity of power converter 985 in a similar manner as described above with respect to primary controller 218 and secondary controller 220. For example, primary controller 986 and secondary controller 987 may operate in a first mode in which primary controller 986 controls the state of power switch 996 according to a primary switching pattern. Primary controller 986 and secondary controller 987 may implement a transition operation to transition from the first mode to the second mode. In the second mode, secondary controller 987 may transmit control signals $U_{CON}$ 1000 that cause primary controller 986 to set power switch 996 into the ON state.

The above description of illustrated examples of the present invention, including what is described in the Abstract, is not intended to be exhaustive or to be limiting to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, times, etc., are provided for explanation purposes and that other values may also be employed in other embodiments and examples in accordance with the teachings of the present disclosure.

What is claimed is:

1. A power converter controller comprising:
    a primary controller configured to operate in a first mode to control a power switch with a primary switching pattern;
    a communication link coupled to the primary controller; and
    a secondary controller coupled to the communication link, wherein the secondary controller is galvanically isolated from the primary controller, wherein the secondary controller is configured to initiate a transition operation with the primary controller to take control of the power switch with one or more control signals through the communication link, wherein the primary controller is configured to acknowledge receipt of the one or more control signals through the communication link to the secondary controller and transition from the first mode to a second mode, wherein the second mode is different than the first mode, and during the second mode the secondary controller transmits the one or more control signals in response to an output voltage of the power converter being less than a threshold output voltage value;

wherein the primary controller includes a signal monitoring circuit that monitors a number of control signals sent by the secondary controller through the communication link, and wherein the signal monitoring circuit determines a potential abnormal operating condition in response to not receiving one control signal for a period of time.

2. The power converter controller of claim 1, wherein the secondary controller is coupled to receive an acknowledgment signal from the primary controller through the communication link.

3. The power converter controller of claim 1, wherein the primary controller is coupled to set the power switch into an ON state in response to the one or more control signals.

4. The power converter controller of claim 1, wherein the primary controller includes a primary switch control circuit to generate a drive signal for the power switch according to the primary switch pattern during the first mode.

5. The power converter controller of claim 4, wherein the primary switch control circuit is coupled to a current sense circuit, wherein the primary switch control circuit sets the power switch in an OFF state in response to an amount of switch current through the power switch.

6. The power converter controller of claim 1, wherein the communication link includes a primary conductive loop and a secondary conductive loop that are galvanically isolated from each other.

7. The power converter controller of claim 6, wherein the primary conductive loop and the secondary conductive loop are magnetically coupled to each other.

8. The power converter controller of claim 7, wherein the primary conductive loop is coupled to a primary switch control circuit, wherein the primary switch control circuit detects the one or more control signals by detecting an induced voltage or current in the primary conductive loop.

9. The power converter controller of claim 1, wherein the primary switching pattern is a fixed switching pattern, and the second mode includes controlling the power switch with a dynamic switching pattern generated in response to the output voltage of the power converter.

10. A power converter controller comprising:
a primary controller configured to operate in a first mode to control a power switch with a primary switching pattern;
a communication link coupled to the primary controller; and
a secondary controller coupled to the communication link, wherein the secondary controller is galvanically isolated from the primary controller, wherein the secondary controller is configured to initiate a transition operation with the primary controller to take control of the power switch with one or more control signals through the communication link, wherein the primary controller is configured to acknowledge receipt of the one or more control signals through the communication link to the secondary controller and transition from the first mode to a second mode, wherein the second mode is different than the first mode, and during the second mode the secondary controller transmits the one or more control signals in response to an output voltage of the power converter being less than a threshold output voltage value;

wherein the primary controller includes a signal monitoring circuit that monitors a number of control signals sent by the secondary controller through the communication link, and wherein the signal monitoring circuit determines a potential abnormal operating condition in response to the signal monitoring circuit receiving an excessive number of control signals over a period of time.

11. A power converter comprising:
an energy transfer element comprising a primary winding and a secondary winding that are galvanically isolated from each other,
a power switch coupled to the primary winding;
a primary controller configured to operate in a first mode to control the power switch with a primary switching pattern;
a communication link coupled to the primary controller; and
a secondary controller coupled to the communication link, wherein the secondary controller is galvanically isolated from the primary controller, wherein the secondary controller is configured to initiate a transition operation with the primary controller to take control of the power switch with one or more control signals through the communication link, wherein the primary controller is configured to acknowledge receipt of the one or more control signals through the communication link to the secondary controller and transition from the first mode to a second mode, wherein the second mode is different than the first mode, and during the second mode the secondary controller transmits the one or more control signals in response to an output voltage of the power converter being less than a threshold output voltage value, wherein the primary controller transmits an acknowledge signal to the secondary controller via the communication link, and the secondary controller is coupled to generate the one or more control signals to control the power switch, and wherein the primary controller is coupled to ignore the one or more control signals from the secondary controller during a blanking period.

12. The power converter of claim 11, wherein the secondary controller generates the one or more control signals when an output voltage is less than a desired output voltage.

13. The power converter of claim 11, wherein the primary controller includes a primary switch control circuit to generate a drive signal for the power switch according to the primary switch pattern during the first mode.

14. The power converter of claim 13, wherein the primary switch control circuit is coupled to a current sense circuit, wherein the primary switch control circuit sets the power switch in an OFF state in response to an amount of switch current through the power switch.

15. The power converter of 11, wherein the primary controller includes a signal monitoring circuit that monitors a number of control signals sent by the secondary controller through the communication link.

16. The power converter of claim 15, wherein the signal monitoring circuit determines a potential abnormal operating condition in response to the signal monitoring circuit receiving an excessive number of control signals over a period of time.

17. The power converter of claim 15, wherein the signal monitoring circuit determines a potential abnormal operating condition in response to not receiving one control signal for a period of time.

18. The power converter of claim 11, wherein the communication link includes a primary conductive loop and a secondary conductive loop that are galvanically isolated from each other.

19. The power converter of claim 18, wherein the primary conductive loop and the secondary conductive loop are magnetically coupled to each other.

20. The power converter of claim 19, wherein the primary conductive loop is coupled to a primary switch control circuit, wherein the primary switch control circuit detects one or more control signals by detecting an induced voltage or current in the primary conductive loop.

* * * * *